US009338607B2

(12) United States Patent
Takehara et al.

(10) Patent No.: US 9,338,607 B2
(45) Date of Patent: *May 10, 2016

(54) INFORMATION DELIVERY SYSTEM FOR SENDING REMINDER TIMES BASED ON EVENT AND TRAVEL TIMES

(71) Applicant: Sony Corporation, Tokyo (JP)

(72) Inventors: Mitsuru Takehara, Tokyo (JP); Yoichiro Sako, Tokyo (JP); Masamichi Asukai, Kanagawa (JP); Taiji Ito, Kanagawa (JP); Akinobu Sugino, Kanagawa (JP); Akane Sano, Tokyo (JP); Yoshiteru Kamatani, Kanagawa (JP); Kazunori Hayashi, Tokyo (JP); Takayasu Kon, Tokyo (JP); Yasunori Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,817

(22) Filed: Mar. 13, 2015

(65) Prior Publication Data

US 2015/0189477 A1    Jul. 2, 2015

Related U.S. Application Data

(63) Continuation of application No. 14/579,187, filed on Dec. 22, 2014, which is a continuation of application No. 13/740,945, filed on Jan. 14, 2013, now Pat. No. 8,942,731, which is a continuation of application No.

(Continued)

(30) Foreign Application Priority Data

Sep. 12, 2007    (JP) .................................. 2007-236722

(51) Int. Cl.
H04W 4/02        (2009.01)
H04W 4/18        (2009.01)

(Continued)

(52) U.S. Cl.
CPC ........... *H04W 4/027* (2013.01); *G06Q 30/0261* (2013.01); *G06Q 30/0267* (2013.01);

(Continued)

(58) Field of Classification Search
CPC ...................................................... H04W 4/02
USPC .................... 455/456.1–456.4, 440, 414.1
See application file for complete search history.

(56) References Cited

U.S. PATENT DOCUMENTS 5,095,532 A    3/1992    Mardus
6,091,956 A    7/2000    Hollenberg (Continued)

FOREIGN PATENT DOCUMENTS

JP    2001-134581 A    5/2001
JP    2003-099449 A    4/2003

(Continued)

*Primary Examiner* — Michael T Vu
(74) *Attorney, Agent, or Firm* — Wolf, Greenfield & Sacks, P.C.

(57) ABSTRACT

There is provided an information delivery apparatus including a receiving portion to receive location information of a mobile communication terminal at a given time and acquired date and time of the location information from the terminal, an event information storage portion to store event information including an event place, date and time, a delivery terminal selecting portion to select the mobile communication terminal to which the event information is to be delivered based on the location information and the acquired date and time of the location information and on the event place, date and time, and an event information delivery portion to deliver the event information to the selected mobile communication terminal. The delivery terminal selecting portion selects the mobile communication terminal whose location indicated by location information is within a predetermined range and whose acquired date and time of the location information are before the event date and time.

18 Claims, 16 Drawing Sheets

Related U.S. Application Data

13/282,901, filed on Oct. 27, 2011, now Pat. No. 8,385,894, which is a continuation of application No. 12/283,081, filed on Sep. 9, 2008, now Pat. No. 8,055,246.

(51) Int. Cl.
  *H04L 29/08* (2006.01)
  *G06Q 30/02* (2012.01)

(52) U.S. Cl.
  CPC .............. *H04L67/18* (2013.01); *H04L 67/20* (2013.01); *H04L 67/26* (2013.01); *H04W 4/02* (2013.01); *H04W 4/18* (2013.01)

(56) References Cited

U.S. PATENT DOCUMENTS

| | | | |
|---|---|---|---|
| 6,970,871 B1 | 11/2005 | Rayburn | |
| 7,139,557 B2 | 11/2006 | Tang et al. | |
| 7,158,797 B1 | 1/2007 | Jayaraman et al. | |
| 7,248,872 B2 | 7/2007 | Bassett et al. | |
| 7,970,418 B2 * | 6/2011 | Schmidt | H04W 4/023 455/456.1 |
| 8,055,246 B2 | 11/2011 | Takehara et al. | |
| 8,385,894 B2 | 2/2013 | Takehara et al. | |
| 8,942,731 B2 | 1/2015 | Takehara et al. | |
| 9,100,776 B2 * | 8/2015 | Basir | G06Q 10/109 |
| 2002/0019835 A1 | 2/2002 | Baur et al. | |
| 2002/0068583 A1 | 6/2002 | Murray | |
| 2003/0060979 A1 | 3/2003 | Andrews et al. | |
| 2003/0088442 A1 | 5/2003 | Michael et al. | |
| 2003/0109985 A1 * | 6/2003 | Kotzin | G08G 1/202 701/420 |
| 2003/0121059 A1 | 6/2003 | Ramaswamy | |
| 2004/0192311 A1 | 9/2004 | Koskinen et al. | |
| 2005/0227712 A1 | 10/2005 | Leonardo William Estevez et al. | |
| 2006/0218029 A1 | 9/2006 | Chin | |
| 2007/0118415 A1 | 5/2007 | Chen et al. | |
| 2007/0250257 A1 | 10/2007 | Almy | |
| 2008/0154696 A1 | 6/2008 | Spiegelman et al. | |
| 2008/0305781 A1 | 12/2008 | Wilson et al. | |
| 2009/0070029 A1 | 3/2009 | Takehara et al. | |
| 2009/0234659 A1 * | 9/2009 | Liao | G06Q 10/047 705/5 |
| 2010/0158202 A1 | 6/2010 | Johnson et al. | |
| 2012/0094641 A1 | 4/2012 | Takehara et al. | |
| 2013/0130720 A1 | 5/2013 | Takehara et al. | |

FOREIGN PATENT DOCUMENTS

| | | |
|---|---|---|
| JP | 2004-056579 A | 2/2004 |
| JP | 2006-146952 A | 6/2006 |
| JP | 2007-133106 A | 5/2007 |
| WO | WO 03/079655 A1 | 9/2003 |
| WO | WO 2005/027006 | 3/2005 |
| WO | WO 2007/051128 A2 | 5/2007 |
| WO | WO 2008/083273 A2 | 7/2008 |

* cited by examiner

INFORMATION DELIVERY SYSTEM FOR SENDING REMINDER TIMES BASED ON EVENT AND TRAVEL TIMES

CROSS-REFERENCE TO RELATED APPLICATION

This application is a continuation of and claims the benefit under 35 U.S.C. §120 of U.S. patent application Ser. No. 14/579,187, titled "INFORMATION DELIVERY SYSTEM FOR SENDING REMINDER TIMES BASED ON EVENT AND TRAVEL TIMES," filed Dec. 22, 2014, which is a continuation of and claims the benefit under 35 U.S.C. §120 of U.S. patent application Ser. No. 13/740,945, filed Jan. 14, 2013, which is a continuation of U.S. patent application Ser. No. 13/282,901, filed on Oct. 27, 2011, which is a continuation of U.S. patent application Ser. No. 12/283,081, filed on Sep. 9, 2008, which claims the benefit under 35 U.S.C. §119 of Japanese Patent Application JP 2007-236722, filed on Sep. 12, 2007, each of which is hereby incorporated by reference in its entirety.

BACKGROUND OF THE INVENTION

1. Field of the Invention

The present invention relates to an information delivery apparatus, an information receiving apparatus, an information delivery method, an information receiving method, and an information delivery system.

2. Description of the Related Art

There has been a technique that delivers an advertisement to a mobile communication terminal such as a cellular phone when the terminal exists in a particular area such as near an advertiser's store. Further, there has been invented a method of registering an attribute (e.g. age, gender, place of residence, occupation etc.) of a person to receive an advertisement in advance, selecting a terminal having an attribute which matches an advertisement and delivering the advertisement to the terminal.

As an example of such an advertisement delivery technique, a music content delivery system which delivers advertisement data to a portable terminal for playing back a music content is disclosed in Japanese Unexamined Patent Application Publication No. 2004-56579, for example. In this system, when a portable terminal plays back a music content, the terminal receives advertisement data which is delivered from a nearby store and plays back the advertisement data and the music content in combination, so that a user who listens to the music content views the advertisement at the same time.

SUMMARY OF THE INVENTION

In the advertisement delivery method according to the above-described related art, an advertisement is delivered based on a current location of a terminal that is an advertisement delivery target. On the other hand, there are cases where an advertiser wishes to deliver an advertisement based not on the current location information but on the past location information of a terminal. For example, if an advertisement is for an event or the like which is held in a predetermined place on predetermined date and time, an advertisement is generally delivered prior to the date and time when the event is held. In such a case, it is desired to deliver the advertisement based on the past location information of a terminal because those who have visited the place of the event before and those who visit the place of the event or its vicinity on a regular basis are likely to visit the place again, even if they are not close to the place where the event is held at the time of delivering the advertisement.

However, although an advertisement can be delivered based on the current location of a terminal that is an advertisement delivery target in the advertisement delivery method of the related art, an advertisement cannot be delivered based on the past location information of a terminal. It is therefore incapable of delivering an advertisement to a user who may come to an event in the case as above, which can lead to the loss of a chance of an advertisement.

In light of the foregoing, it is desirable to provide a novel and improved information delivery apparatus, information receiving apparatus, information delivery method, information receiving method and information delivery system which are capable of delivering event information by selecting a terminal of a user who is likely to come to an event, thereby improving advertising effects of event information delivery.

According to an embodiment of the present invention, there is provided an information delivery apparatus which includes a receiving portion to receive location information of a mobile communication terminal at a given time point and acquired date and time of the location information from the mobile communication terminal, an event information storage portion to store event information including an event place, an event date and an event time of an event held in a predetermined place on predetermined date and time, a delivery terminal selecting portion to select a mobile communication terminal to which the event information is to be delivered based on the location information and the acquired date and time of the location information received by the receiving portion and on the event place, the event date and the event time, and an event information delivery portion to deliver the event information stored in the event information storage portion to the mobile communication terminal selected by the delivery terminal selecting portion. In the information delivery apparatus, the delivery terminal selecting portion selects the mobile communication terminal whose location indicated by the location information is within a predetermined range defined depending on the event place and whose acquired date and time of the location information are before the event date and time.

This configuration enables notification of the detail of the event or the like to the mobile communication terminal of a user who has visited the event place or its vicinity before. It is thereby possible to deliver event information by selecting a user who is likely to come to the event, which improves advertising effects of event information delivery.

The information delivery apparatus may further include an attribute information storage portion to store attribute information of a user of the mobile communication terminal, and the delivery terminal selecting portion may select the mobile communication terminal having the attribute information related to the event information from the selected mobile communication terminal.

The delivery terminal selecting portion may select at most a predetermined number of mobile communication terminals.

The delivery terminal selecting portion may select the mobile communication terminal in increasing order of a time length from the acquired date and time of the location information within the predetermined range defined depending on the event place to the event date and time.

The delivery terminal selecting portion may refrain from selecting the mobile communication terminal if the distance between a current location of the mobile communication terminal and the event place exceeds a predetermined value.

The delivery terminal selecting portion may calculate a travel time from the current location of the mobile communication terminal to the event place and refrain from selecting the mobile communication terminal if the calculated travel time is longer than the interval between current time and the event time.

According to another embodiment of the present invention, there is provided an information receiving apparatus which includes a location information acquiring portion to acquire location information indicating a current location, a location information storage portion to accumulate and store location information acquired by the location information acquiring portion and acquired date and time of the location information, an event information receiving portion to receive event information including an event place, an event date and an event time of an event held in a predetermined place on predetermined date and time, and an event information selecting portion to select the event information to be notified to a user based on the location information and the acquired date and time of the location information stored in the location information storage portion and on the event place, the event date and the event time included in the event information. In the information receiving apparatus, the event information selecting portion selects the event information if the location information stored in the location information storage portion is within a predetermined range defined depending on the event place and the acquired date and time of the location information are before the event date and time.

In this configuration, a terminal which receives information can refer to its past location information and presents only related event information to a user. This eliminates the need to notify location information from a terminal to the information delivery apparatus, thereby reducing a communication traffic amount from the terminal and processing for the communication. This also eliminates the need to store location information of each terminal in an information delivering end, thereby reducing a storage area to be reserved.

The information receiving apparatus may further include an attribute information storage portion to store attribute information of a user, and the event information selecting portion may select the event information related to the attribute information.

The event information selecting portion may refrain from selecting the event information if the distance between the current location and the event place exceeds a predetermined value.

The event information selecting portion may calculate a travel time from the current location to the event place and refrain from selecting the event information if the calculated travel time is longer than the interval between current time and the event time.

According to another embodiment of the present invention, there is provided an information delivery method which includes the steps of receiving location information of a mobile communication terminal at a given time point and acquired date and time of the location information from the mobile communication terminal, selecting the mobile communication terminal to which event information about an event is to be delivered based on the location information and the acquired date and time of the location information received in the receiving step and on an event place, an event date and en event time of the event held in a predetermined place on predetermined date and time, and delivering the event information to the mobile communication terminal selected in the selecting step. In the information delivery method, the mobile communication terminal whose location indicated by the location information is within a predetermined range defined depending on the event place and whose acquired date and time of the location information are before the event date and time is selected in the selecting step.

According to another embodiment of the present invention, there is provided an information receiving method which includes the steps of acquiring location information indicating a current location, storing the location information acquired in the acquiring step and acquired date and time of the location information into a storage medium, receiving event information including an event place, an event date and an event time of an event held in a predetermined place on predetermined date and time, and selecting the event information to be notified to a user based on the location information and the acquired date and time of the location information stored in the storage medium and on the event place, the event date and the event time included in the event information. In the information receiving method, the event information is selected in the selecting step if the location information stored in the storage medium is within a predetermined range defined depending on the event place and the acquired date and time of the location information are before the event date and time.

According to another embodiment of the present invention, there is provided an information delivery system which includes an information receiving apparatus that acquires and supplies location information and an information delivery apparatus that delivers event information based on the location information supplied by the information receiving apparatus. The information delivery apparatus includes a receiving portion to receive location information at a given time point and acquired date and time of the location information from the information receiving apparatus, an event information storage portion to store event information including an event place, an event date and an event time of an event held in a predetermined place on predetermined date and time, a delivery terminal selecting portion to select an information receiving apparatus to which the event information is to be delivered based on the location information and the acquired date and time of the location information received by the receiving portion and on the event place, the event date and the event time, and an event information delivery portion to deliver the event information stored in the event information storage portion to the information receiving apparatus selected by the delivery terminal selecting portion, and the delivery terminal selecting portion selects the information receiving apparatus whose location indicated by the location information is within a predetermined range defined depending on the event place and whose acquired date and time of the location information are before the event date and time.

According to another embodiment of the present invention, there is provided an information delivery system which includes an information receiving apparatus that acquires and accumulates location information and an information delivery apparatus that delivers event information about an event held in a predetermined place on predetermined date and time to the information receiving apparatus. The information receiving apparatus includes a location information acquiring portion to acquire location information indicating a current location, a location information storage portion to accumulate and store location information acquired by the location information acquiring portion and acquired date and time of the location information, an event information receiving portion to receive event information including an event place, an event date and an event time of the event delivered by the information delivery apparatus, and an event information selecting portion to select the event information to be notified to a user based on the location information and the acquired date and time of the location information stored in the location information storage portion and on the event place, the event date and the event time included in the event information, and the event information selecting portion selects the event information if the location information stored in the location information storage portion is within a predetermined range defined depending on the event place and the acquired date and time of the location information are before the event date and time.

According to the embodiments of the present invention described above, it is possible to deliver event information by selecting a terminal of a user who is likely to come to an event, thereby improving advertising effects of event information delivery.

DETAILED DESCRIPTION OF THE PREFERRED EMBODIMENTS

Figure 1:
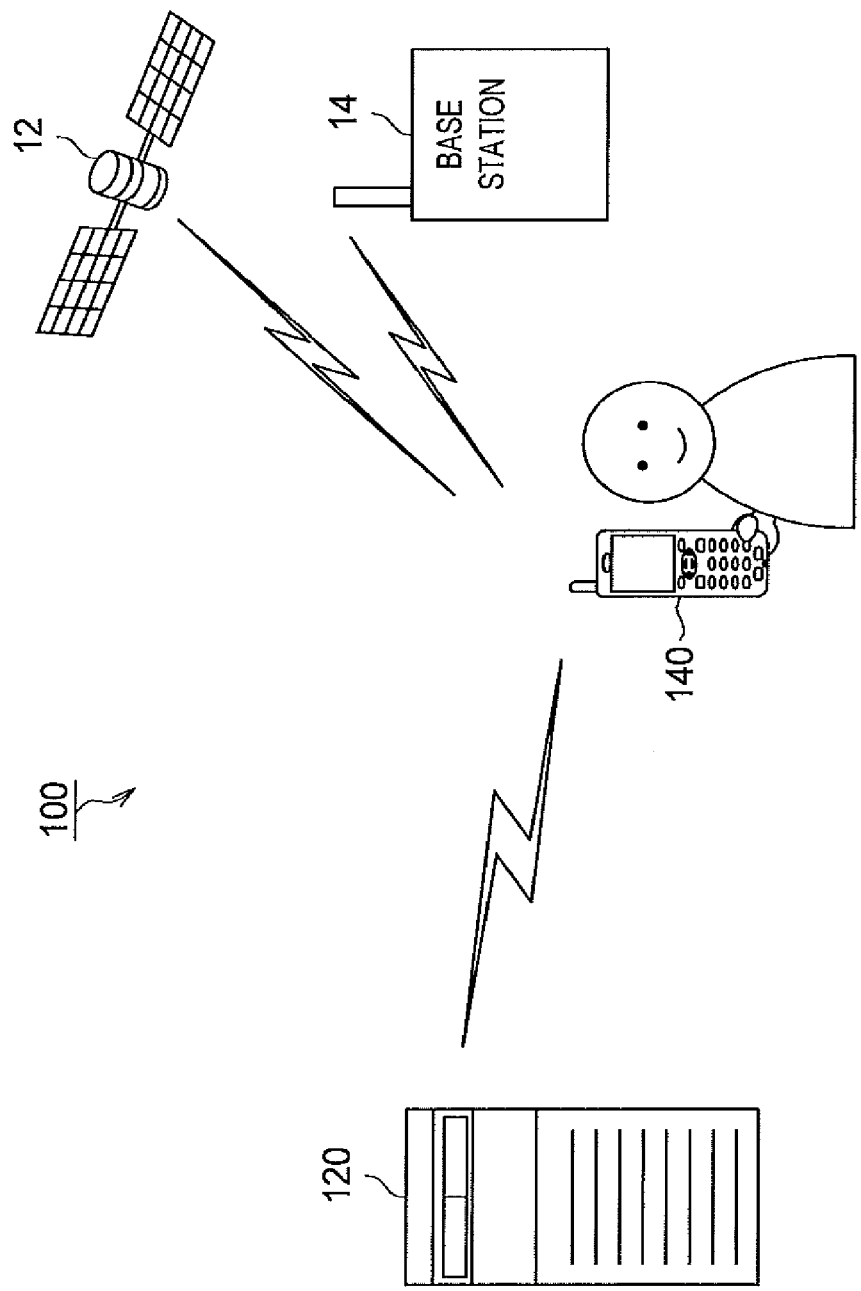
FIG. 1 is a block diagram showing a schematic configuration of an information delivery system according to a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(First Embodiment)

Referring first to FIG. 1, an information delivery system according to a first embodiment of the present invention is described hereinafter. FIG. 1 is a block diagram showing a schematic configuration of an information delivery system according to the first embodiment of the present invention. As shown in FIG. 1, an information delivery system 100 according to the first embodiment is composed of an information delivery apparatus 120 and an information receiving apparatus 140.

The information receiving apparatus 140 is a portable information terminal which has a communication function such as a cellular phone and a personal digital assistant (PDA), for example. The information receiving apparatus 140 receives event information which is delivered from the information delivery apparatus 120 and displays the received event information on a display portion such as LCD. Further, the information receiving apparatus 140 acquires location information which indicates its current location from a GPS satellite 12 or a base station 14 that is installed by a cellular phone carrier and supplies the received location information and information about an acquired time to the information delivery apparatus 120.

The information delivery apparatus 120 delivers event information at an advertiser's request to one or more information receiving apparatus 140. Although FIG. 1 illustrates one information receiving apparatus 140 for simplification of description, there may be a plurality of information receiving apparatus 140. The event information which is delivered by the information delivery apparatus 120 is information about an event that is held in a predetermined place on predetermined date and time, and it includes information about the date and time and the place when and where the event is held, information about the detail of the event, and information about delivery of the event information. The information delivery apparatus 120 receives location information and information about acquired date and time of the location information from the information receiving apparatus 140 and compares the received information with the information about the place and the date and time of the event, thereby determining whether to deliver the event information to the information receiving apparatus 140.

In the information delivery system 100 of such a configuration, an advertiser which holds an event can deliver event information based on location information that is transmitted from a cellular phone or the like of each user. The advertiser can thereby deliver information by selecting a user who is likely to come to the event, thus increasing advertising effects.

Figure 2:
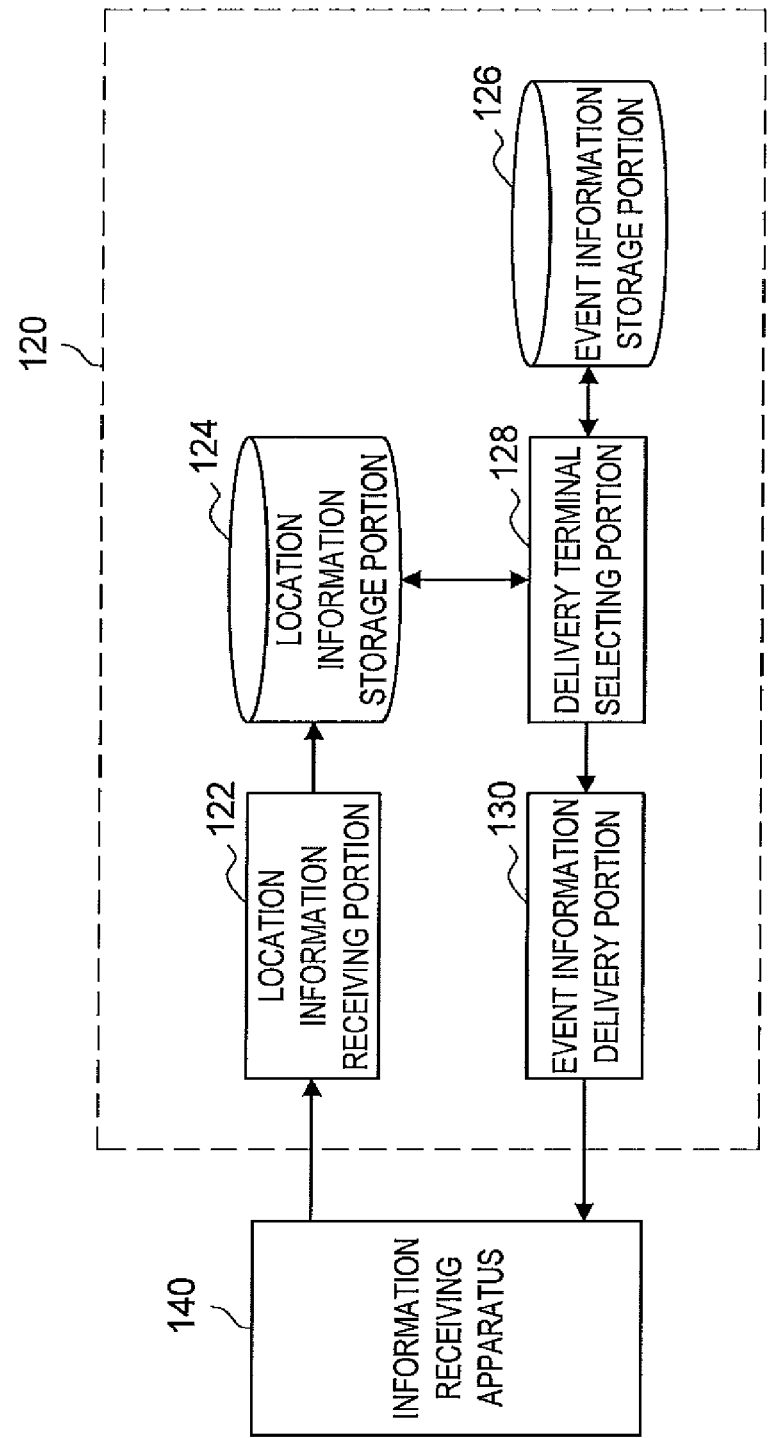
FIG. 2 is a functional block diagram showing a schematic configuration of an information delivery apparatus according to the first embodiment.

Referring next to FIG. 2, functions which are implemented by the information delivery apparatus 120 according to this embodiment are described hereinafter. FIG. 2 is a functional block diagram showing a schematic configuration of the information delivery apparatus 120 according to the first embodiment of the present invention.

As shown in FIG. 2, the information delivery apparatus 120 includes a location information receiving portion 122, a location information storage portion 124, an event information storage portion 126, a delivery terminal selecting portion 128, and an event information delivery portion 130. The location information receiving portion 122, the delivery terminal selecting portion 128 and the event information delivery portion 130 may be implemented by installing software program for executing the functions of those portions into the information delivery apparatus 120 or may be implemented using dedicated hardware. Further, the software program may be executed by reading out the program stored in a computer-readable storage medium or may be provided to the information delivery apparatus 120 through a network or the like. The location information storage portion 124 and the event information storage portion 126 may be configured by a storage medium such as semiconductor memory, an optical disk and a magnetic disk, for example.

The location information receiving portion 122 receives location information and acquired date and time of the location information which are transmitted from the information receiving apparatus 140. The location information may be information about the latitude, longitude and altitude of the information receiving apparatus 140 at a certain point, information indicating the area where the information receiving apparatus 140 exists and so on. The location information storage portion 124 stores the location information and the information about the acquired date and time of the location information which are received by the location information receiving portion 122 and the information about the information receiving apparatus 140 in association with each other.

The event information storage portion 126 is a storage portion for storing information (event information) about an event which is held in a predetermined place on predetermined date and time. Event information may be provided by an advertiser which requests the delivery of event information and input to the information delivery apparatus 120 through a network or the like, for example. Event information includes information about the place and the date and time of an event, information indicating the detail of an event, a period of delivering event information, a range of delivery terminal location of event information, a condition of delivering event information and so on. Information indicating the detail of an event may be information such as a title of an event, a schedule of an event, text or image data indicating the detail of an event and a discount ticket for an event, for example.

A range of delivery terminal location of event information is defined in order to determine whether to deliver event information to a terminal (information receiving apparatus 140) of each user, and, if location information which is transmitted from a terminal is included in the defined range, event information is delivered to the terminal. A range of delivery terminal location may be a certain distance range from an event place where an event is held or a certain distance range from the nearest station of an event place, for example. A range of delivery terminal location may not include an event place. A condition of delivering event information is a keyword for narrowing down users to whom event information is to be delivered, attribute information (e.g. age, gender, place of residence, interest etc.) of users who are delivery targets, and so on.

The delivery terminal selecting portion 128 selects the information receiving apparatus 140 to which event information that is stored in the event information storage portion 126 is to be delivered based on location information of the information receiving apparatus 140 and acquired date and time of the location information that are received by the location information receiving portion 122. Specifically, the delivery terminal selecting portion 128 refers to a range of delivery terminal location of event information which is stored in the event information storage portion 126 and determines whether location information of each information receiving apparatus 140 which is stored in the location information storage portion 124 falls within that range. If there is location information that falls within the range of delivery terminal location, the delivery terminal selecting portion 128 determines whether acquired date and time of the location information is before the date and time when an event is held, and if it is before the event date and time, the delivery terminal selecting portion 128 selects the relevant information receiving apparatus 140 as a delivery terminal of event information. The event information delivery portion 130 delivers event information to the information receiving apparatus 140 which is selected by the delivery terminal selecting portion 128.

The delivery terminal selecting portion 128 may select all of the information receiving apparatus 140 of which past location information falls within a range of delivery terminal location or may limits the number of the information receiving apparatus 140 to be selected (e.g. to 100). At this time, the delivery terminal selecting portion 128 may select the information receiving apparatus 140 sequentially in increasing order of a time length from the acquired date and time of location information within a range of delivery terminal location to the current date and time. It is thereby possible to deliver event information preferentially to a user who has visited the place of an event most recently to the time of delivering the event information.

Figure 3:
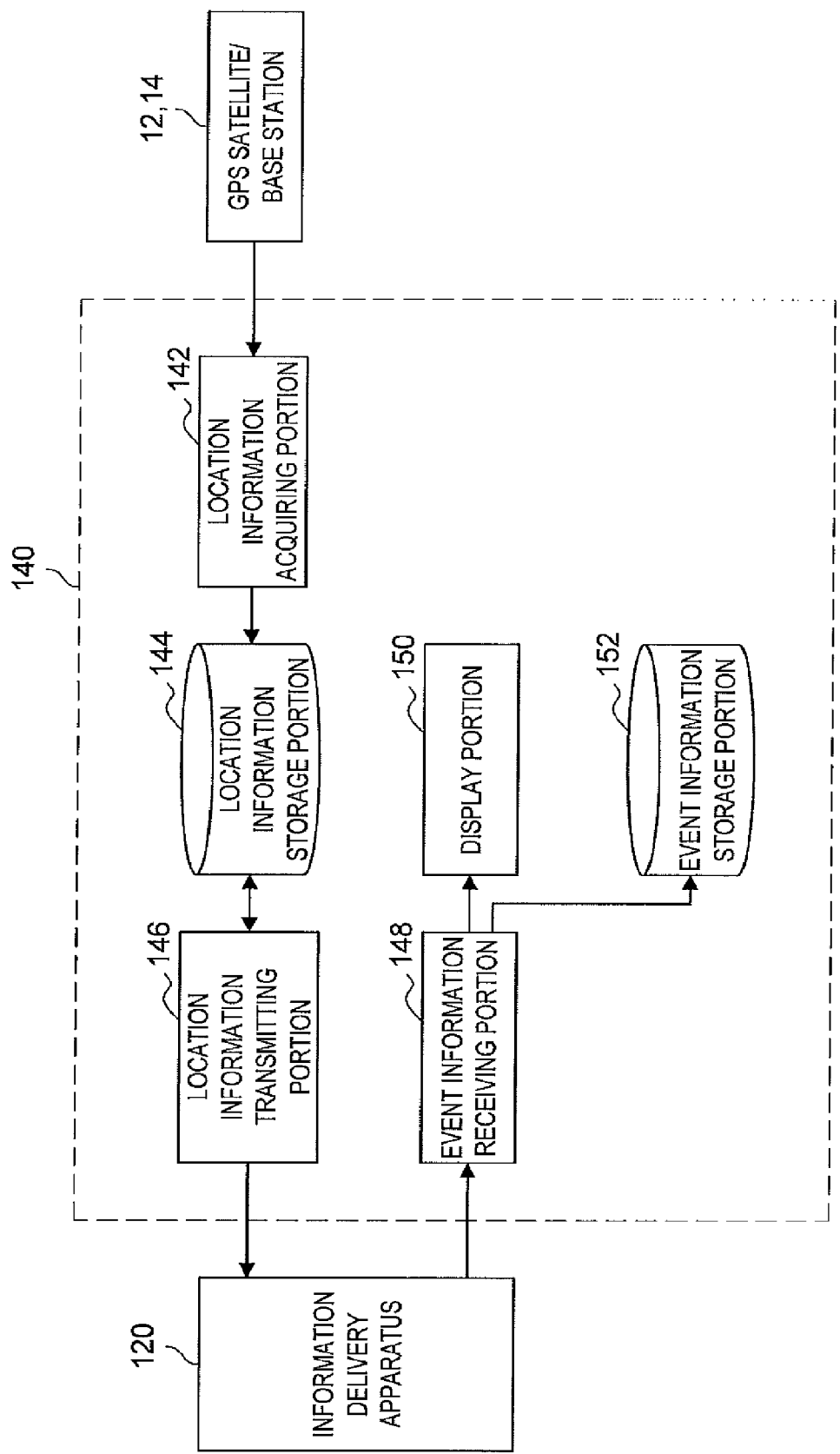
FIG. 3 is a functional block diagram showing a schematic configuration of an information receiving apparatus according to the first embodiment.

Referring then to FIG. 3, functions which are implemented by the information receiving apparatus 140 according to this embodiment are described hereinafter. FIG. 3 is a functional block diagram showing a schematic configuration of the information receiving apparatus 140 according to the first embodiment of the present invention.

As shown in FIG. 3, the information receiving apparatus 140 includes a location information acquiring portion 142, a location information storage portion 144, a location information transmitting portion 146, an event information receiving portion 148, a display portion 150, and an event information storage portion 152. The location information acquiring portion 142, the location information transmitting portion 146 and the event information receiving portion 148 may be implemented by installing software program for executing the functions of those portions into the information receiving apparatus 140 or may be implemented using dedicated hardware. Further, the software program may be executed by reading out the program stored in a computer-readable storage medium or may be provided to the information receiving apparatus 140 through a network or the like. The location information storage portion 144 and the event information storage portion 152 may be configured by a storage medium such as semiconductor memory, an optical disk and a magnetic disk, for example. The display portion 150 may be configured by a display device such as a liquid crystal display (LCD).

The location information acquiring portion 142 acquires location information which indicates its current location from the GPS satellite 12 or the base station 14 that is installed by a cellular phone carrier. The location information may be acquired periodically at regular time intervals or may be acquired at irregular timings such as when the information receiving apparatus 140 goes through a predetermined place (e.g. a station, a building serving as a landmark of an area etc.). Acquired location information and acquired date and time of the location information are stored into the location information storage portion 144 and then transmitted to the information delivery apparatus 120 by the location information transmitting portion 146. Alternatively, location information and information about acquired date and time may be supplied directly from the location information acquiring portion 142 to the location information transmitting portion 146 and transmitted to the information delivery apparatus 120.

The event information receiving portion 148 receives event information which is transmitted from the information delivery apparatus 120 and makes it display on the display portion 150. The event information which is received by the event information receiving portion 148 may be stored into the event information storage portion 152 so that it is accumulated in the information receiving apparatus 140.

Figure 4:
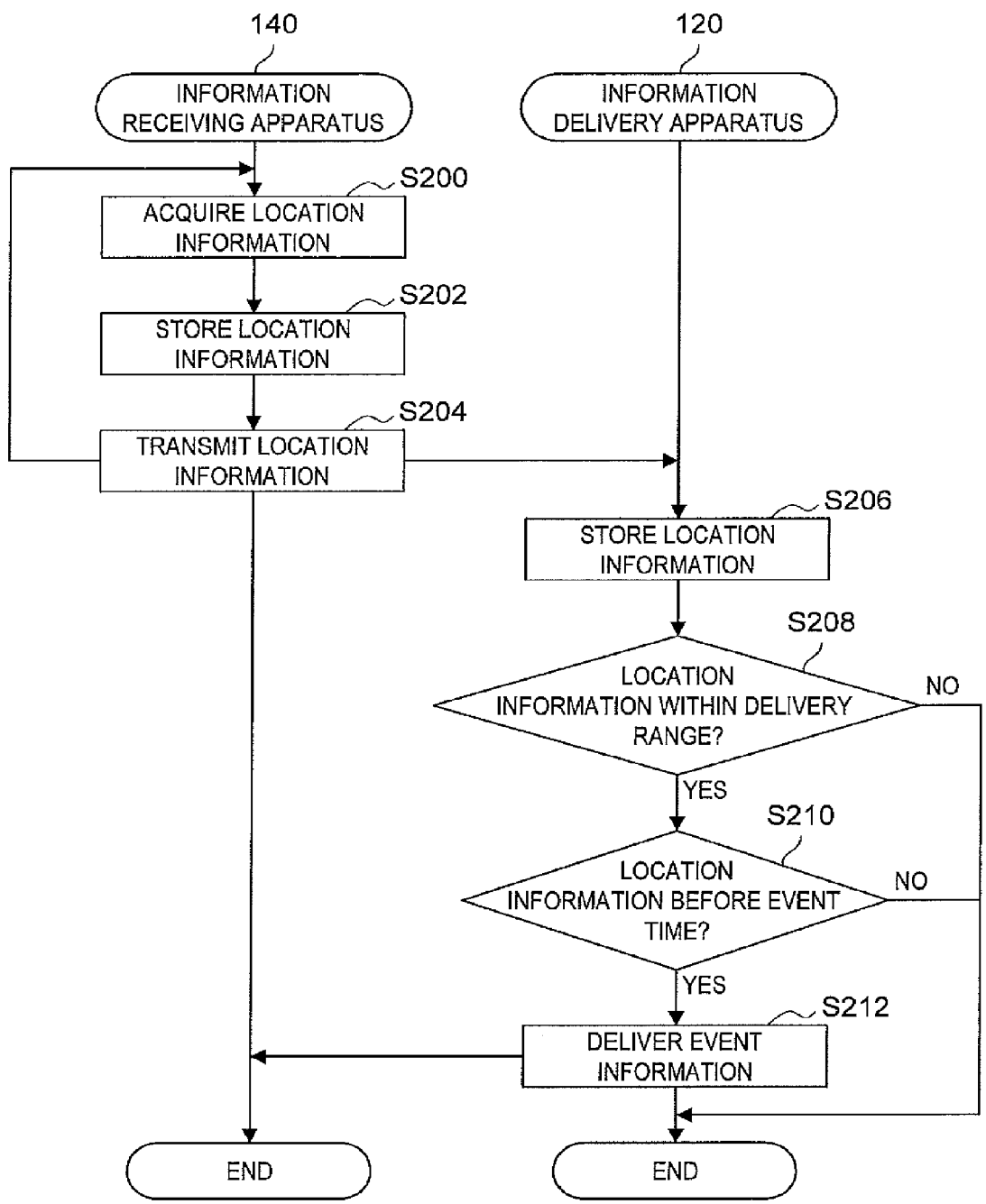
FIG. 4 is a flowchart showing a flow of an information delivery process which is executed by the information delivery system according to the first embodiment.

Referring further to FIG. 4, an information delivery process which is executed by the information delivery system 100 according to this embodiment is described hereinafter. FIG. 4 is a flowchart showing a flow of the information delivery process which is executed by the information delivery system 100 according to the first embodiment of the present invention. In FIG. 4, the steps S200 to S206 are a location information notification process from the information receiving apparatus 140 to the information delivery apparatus 120, and the steps S208 to S212 are an information delivery process in the information delivery apparatus 120.

First, the location information acquiring portion 142 of the information receiving apparatus 140 acquires location information which indicates its current location from the GPS satellite 12 or the base station 14 (step S200). Next, the acquired location information and the acquired data and time of the location information are stored into the location information storage portion 144 (step S202). The location information which is stored in the location information storage portion 144 is transmitted by the location information transmitting portion 146 to the information delivery apparatus 120 at regular time intervals, for example (step S204). The information receiving apparatus 140 performs the processing of the steps S200 to S204 repeatedly and transmits the acquired location information sequentially to the information delivery apparatus 120.

On the other hand, the information delivery apparatus 120 receives location information from the information receiving apparatus 140 and stores it into the location information storage portion 124 (step S206). Then, the delivery terminal selecting portion 128 of the information delivery apparatus 120 compares location information of each information receiving apparatus 140 which is stored in the location information storage portion 124 with a range of delivery terminal location of event information and determines whether there is location information which is included in the range (step S208). For example, if an event is held in "Shinjuku" and a range of delivery terminal location is "the area within a distance of 500 meters from Shinjuku Station", the information receiving apparatus 140 for which the location information at the point within a distance of 500 meters from Shinjuku Station has been recorded in the past corresponds thereto.

If there is corresponding location information in the step S208, the acquired date and time of the location information are compared with the time when the event is held, and it is determined whether the location information acquired date and time are earlier than the event time (step S210). If this determination condition is satisfied, the delivery terminal selecting portion 128 selects the information receiving apparatus 140 having the relevant location information as a delivery terminal, and the event information delivery portion 130 delivers the event information to the selected information receiving apparatus 140 (step S212). The event information is not delivered to the information receiving apparatus 140 which do not satisfy the determination condition in the step S208 or the step S210.

In such a process, the detail of an event or the like can be notified to a portable terminal of a user who has visited a certain area, such as the place where the event is held or its vicinity, in the past. It is thereby possible to deliver event information by selecting users who are likely to come to the event, which improves advertising effects of event information delivery.

Further, when acquired date and time of location information which is stored in the location information storage portion 124 of the information delivery apparatus 120 becomes a predetermined past time (e.g. two weeks before the current date and time), the location information may be eliminated from the location information storage portion 124. This limits location information to be used for delivery terminal selection within a predetermined past time period, thereby avoiding reference to old location information.

Furthermore, the delivery terminal selecting portion 128 may count the number of the information receiving apparatus 140 which satisfy the condition after the step S210 and limits the number of the information receiving apparatus 140 to be selected to no more than a certain number (e.g. 10). This allows grasping of the maximum number of terminals to which event information is to be delivered in advance, thus offering advantages such as keeping advertising costs within a certain limit to an advertiser which requests delivery of event information. In this case, the delivery terminal selecting portion 128 may select the information receiving apparatus 140 sequentially in decreasing order of recency of the acquired date and time of the location information which satisfies the condition, for example. This enables delivery of event information preferentially to a user who has visited the place recently to the time of delivering the advertisement, which is, a user who is more likely to come to the event.

Although the first embodiment has described that the delivery terminal selecting portion 128 selects delivery terminals depending on whether the past location information which is transmitted from the information receiving apparatus 140 falls within a range of delivery terminal location of event information, it may further narrow down delivery terminals using information different from location information after selecting delivery terminals by the above-described method.

For example, each information receiving apparatus 140 may previously register attribute information, such as an age, gender, place of residence, interest and occupation, of a user into the information delivery apparatus 120, and the delivery terminal selecting portion 128 of the information delivery apparatus 120 may compare the attribute information with information about a delivery condition which is included in event information and select the information receiving apparatus 140 of a user who has the attribute information that matches the delivery condition as a delivery terminal.

(Second Embodiment)

Figure 5:
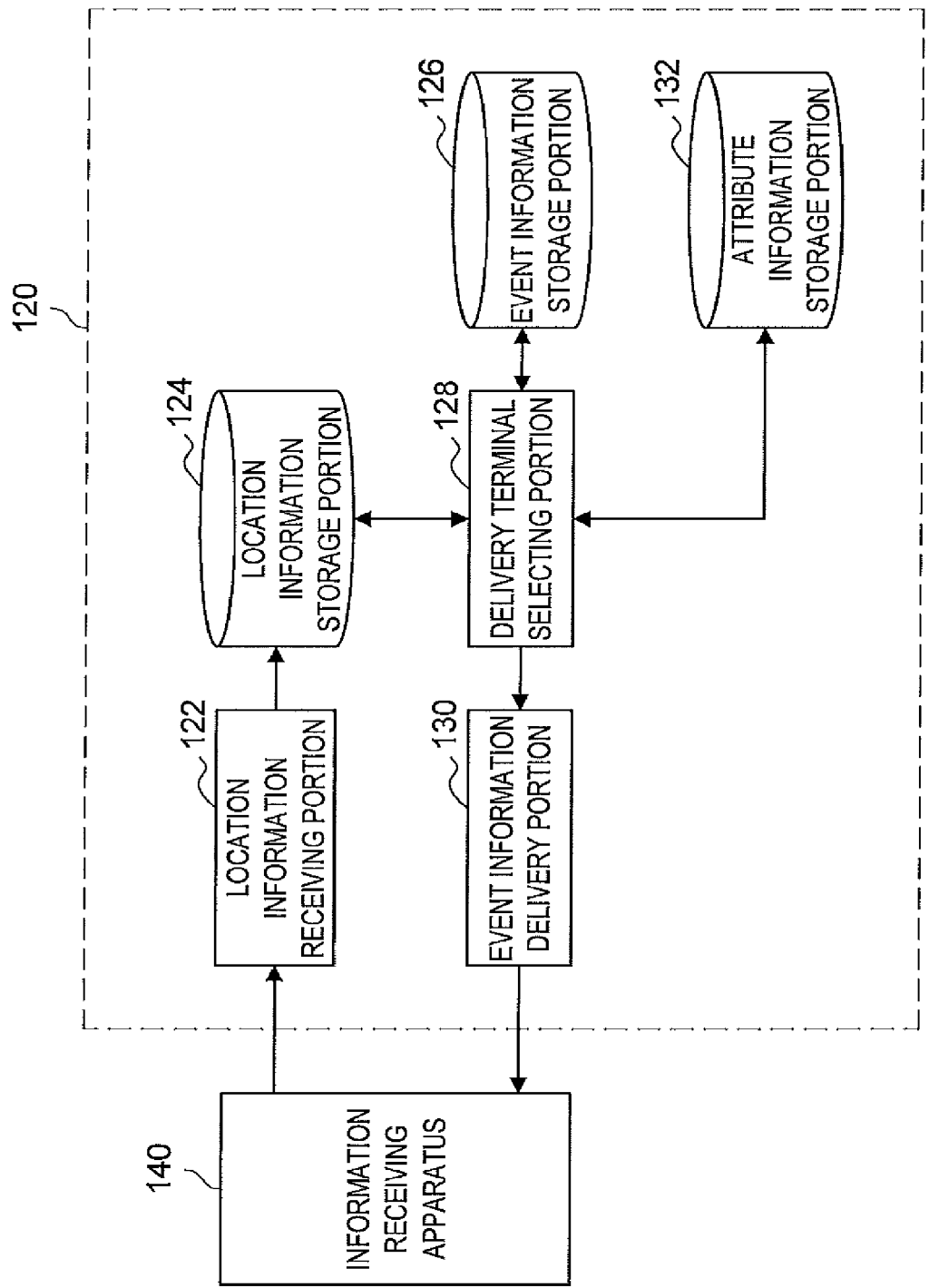
FIG. 5 is a functional block diagram showing a schematic configuration of an information delivery apparatus according to a second embodiment of the present invention.
Figure 6:
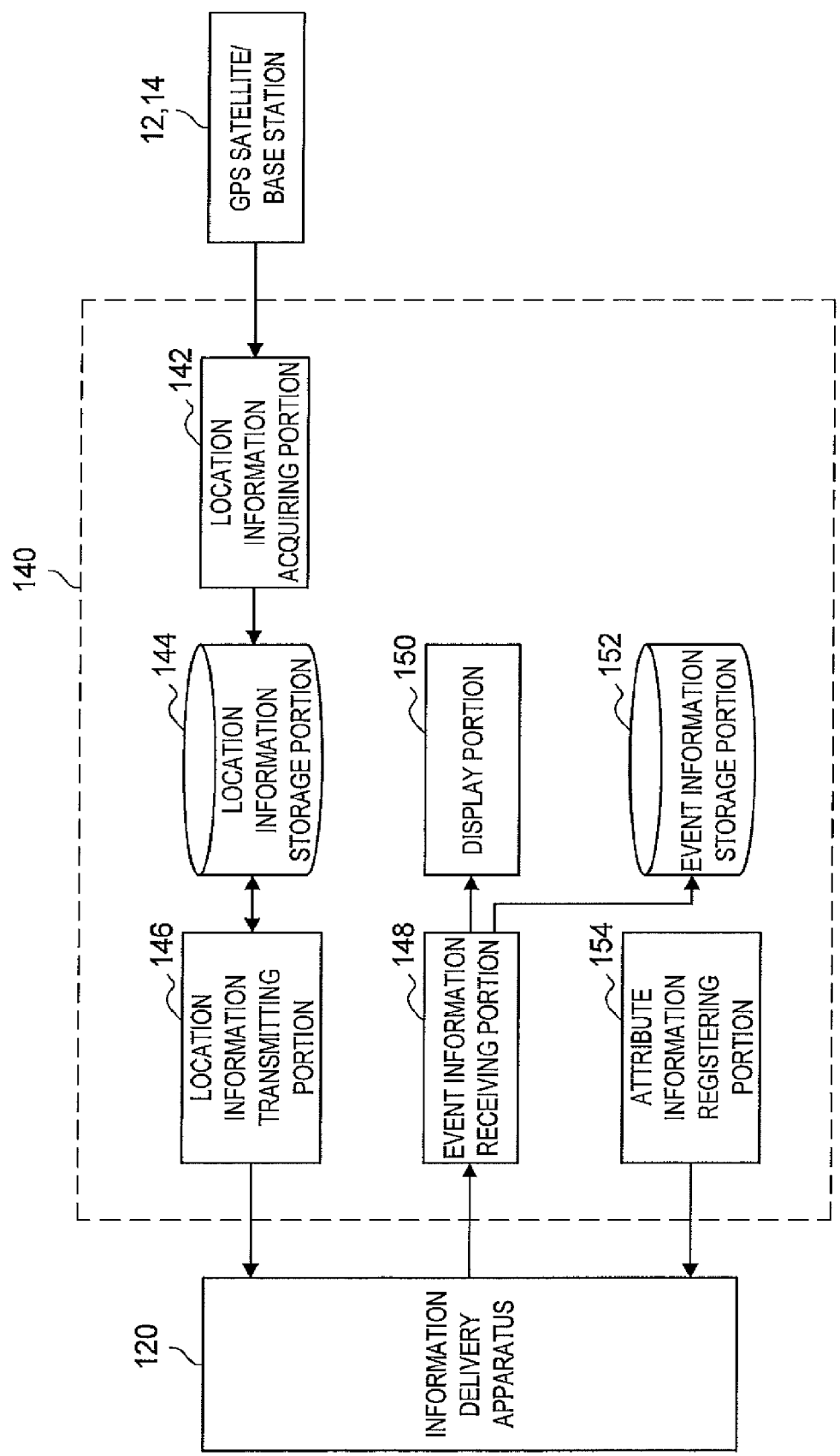
FIG. 6 is a functional block diagram showing a schematic configuration of an information receiving apparatus according to the second embodiment.

A second embodiment of the present invention describes the case where the information delivery apparatus 120 selects a delivery terminal using information that is different from location information of the information receiving apparatus 140. FIG. 5 is a functional block diagram showing an example of the information delivery apparatus 120 which selects a delivery terminal using information that is different from location information of the information receiving apparatus 140. FIG. 6 is a functional block diagram showing an example of the information receiving apparatus 140 which registers attribute information into the information delivery apparatus 120 in advance. In FIGS. 5 and 6, the functional portions which correspond to those shown in FIGS. 2 and 3 are denoted by the same reference numerals, and the description of those are omitted as appropriate in order to avoid redundant description.

The information delivery apparatus 120 shown in FIG. 5 is different from the information delivery apparatus 120 shown in FIG. 2 in that it further includes an attribute information storage portion 132 and narrows down terminals to which event information is to be delivered with use of attribute information of each information receiving apparatus 140 which is stored in the attribute information storage portion 132. Further, the information receiving apparatus 140 shown in FIG. 6 is different from the information receiving apparatus 140 shown in FIG. 3 in that it further includes an attribute information registering portion 154 and registers attribute information of a user into the information delivery apparatus 120 in advance.

The attribute information registering portion 154 of the information receiving apparatus 140 transmits data of user attribute information which is input through an input portion such as a keyboard, a mouse or a microphone (not shown) that is equipped with the information receiving apparatus 140 or transmitted to the information receiving apparatus 140 through a network to the information delivery apparatus 120 for registration. User attribute information may be information such as age, gender, place of residence, occupation, interest and preference of a user. The information delivery apparatus 120 receives data of attribute information which is transmitted by the attribute information registering portion 154 of the information receiving apparatus 140 and stores it into the attribute information storage portion 132 in association with information indicating each information receiving apparatus 140 (e.g. ID, user name etc.).

The information delivery apparatus 120 according to this embodiment is different from the information delivery apparatus 120 according to the first embodiment in that the delivery terminal selecting portion 128 selects delivery terminals based on location information of the information receiving apparatus 140 and further narrows down delivery terminals using attribute information of each information receiving apparatus 140 which is stored in the attribute information storage portion 132. The delivery terminal selecting portion 128 compares the attribute information of the information receiving apparatus 140 which is stored in the attribute information storage portion 132 with information about a delivery condition which is included in event information and selects the information receiving apparatus 140 which has the attribute information that matches the delivery condition as a delivery terminal, in addition to performing the function of the delivery terminal selecting portion 128 according to the first embodiment. For example, when the condition that "user's age is 20's or 30's" is designated as a delivery condition of event information, if the value of an age which is registered as attribute information of the information receiving apparatus 140 is 20 to 39, the delivery terminal selecting portion 128 selects the information receiving apparatus 140 as a delivery terminal, and if not, it does not select the information receiving apparatus 140 as a delivery terminal.

Figure 7:
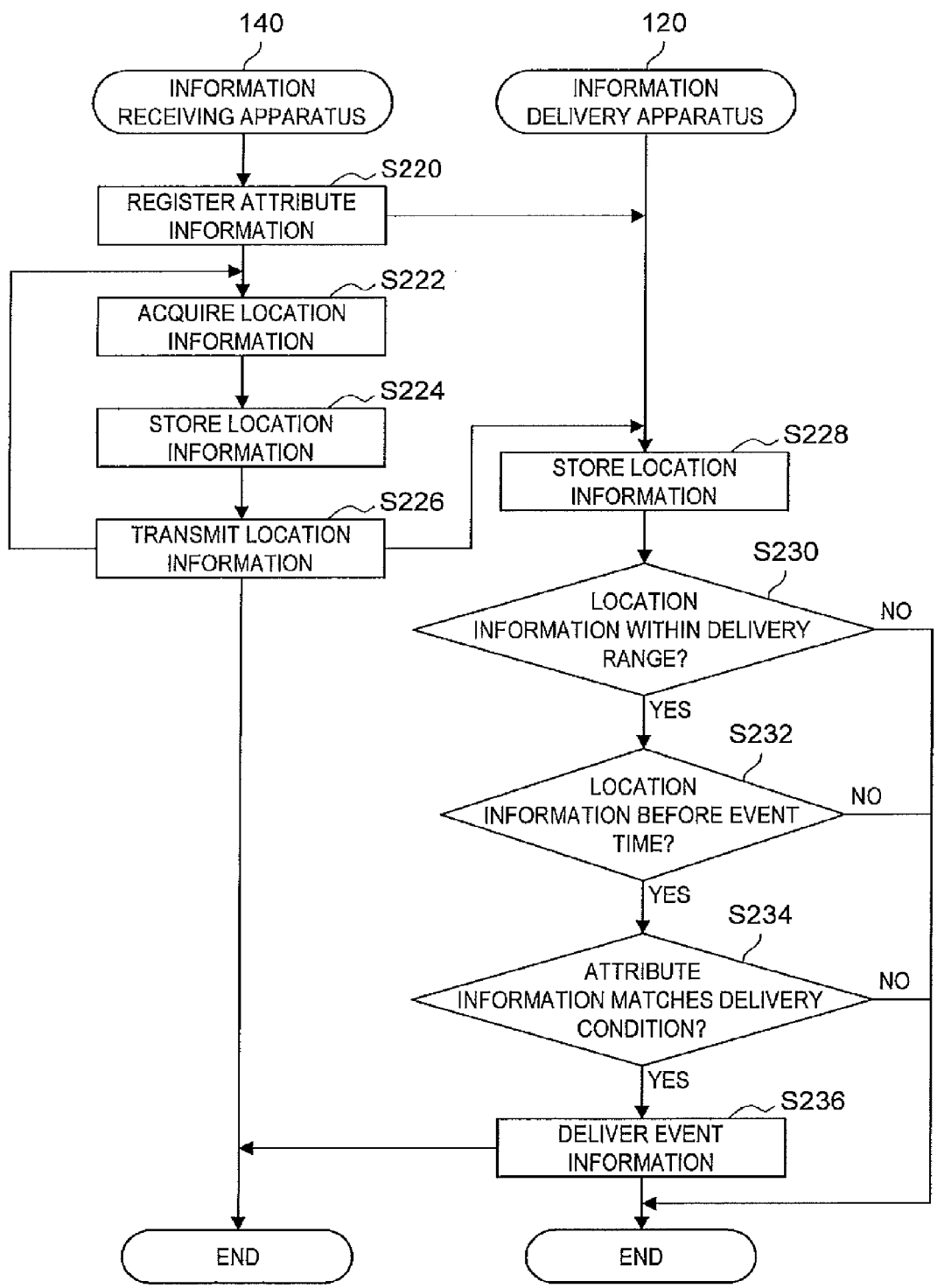
FIG. 7 is a flowchart showing a flow of an information delivery process which is executed by an information delivery system according to the second embodiment.

Referring then to FIG. 7, an information delivery process in the case of using the information delivery apparatus 120 of FIG. 5 and the information receiving apparatus 140 of FIG. 6 is described hereinafter. FIG. 7 is a flowchart showing a flow of an information delivery process which is executed by the information delivery system 100 according to the second embodiment of the present invention.

First, the information receiving apparatus 140 registers user attribute information into the information delivery apparatus 120 in advance (step S220). Next, the information receiving apparatus 140 periodically notifies its location information to the information delivery apparatus 120 by the processing in the steps S222 to S228. The processing in the steps S222 to S228 is the same as the processing in the steps S200 to S206 shown in FIG. 4 and thus not described in detail herein.

Then, the delivery terminal selecting portion 128 of the information delivery apparatus 120 compares the location information of each information receiving apparatus 140 with a range of delivery terminal location of event information and selects terminals (information receiving apparatus) to which event information is to be delivered by the processing in the steps S230 to S232. The processing in the steps S230 to S232 is the same as the processing in the steps S208 to S210 shown in FIG. 4.

Further, the delivery terminal selecting portion 128 compares the attribute information of each information receiving apparatus 140 which is selected by the steps S230 to S232 with a delivery condition of event information (step S234). If the attribute information which is registered in the attribute information storage portion 132 matches the delivery condition, the relevant information receiving apparatus 140 is selected as a delivery terminal, and the event information is delivered thereto (step S236). It is thereby possible to deliver the event information by narrowing down persons who are likely to be interested in the event from those who have visited the designated place, which further improve advertising effects of the event information.

Although the information delivery apparatus 120 selects a delivery terminal based on the past location information of the information receiving apparatus 140 in the first and second embodiments described above, it may select a delivery terminal using the current location information in addition to the past location information. For example, even if a user of a terminal has visited an event place in the past, the information delivery apparatus 120 may refrain from selecting the terminal when it has been moved far away from the place at the time of delivering event information.

(Third Embodiment)

Figure 8:
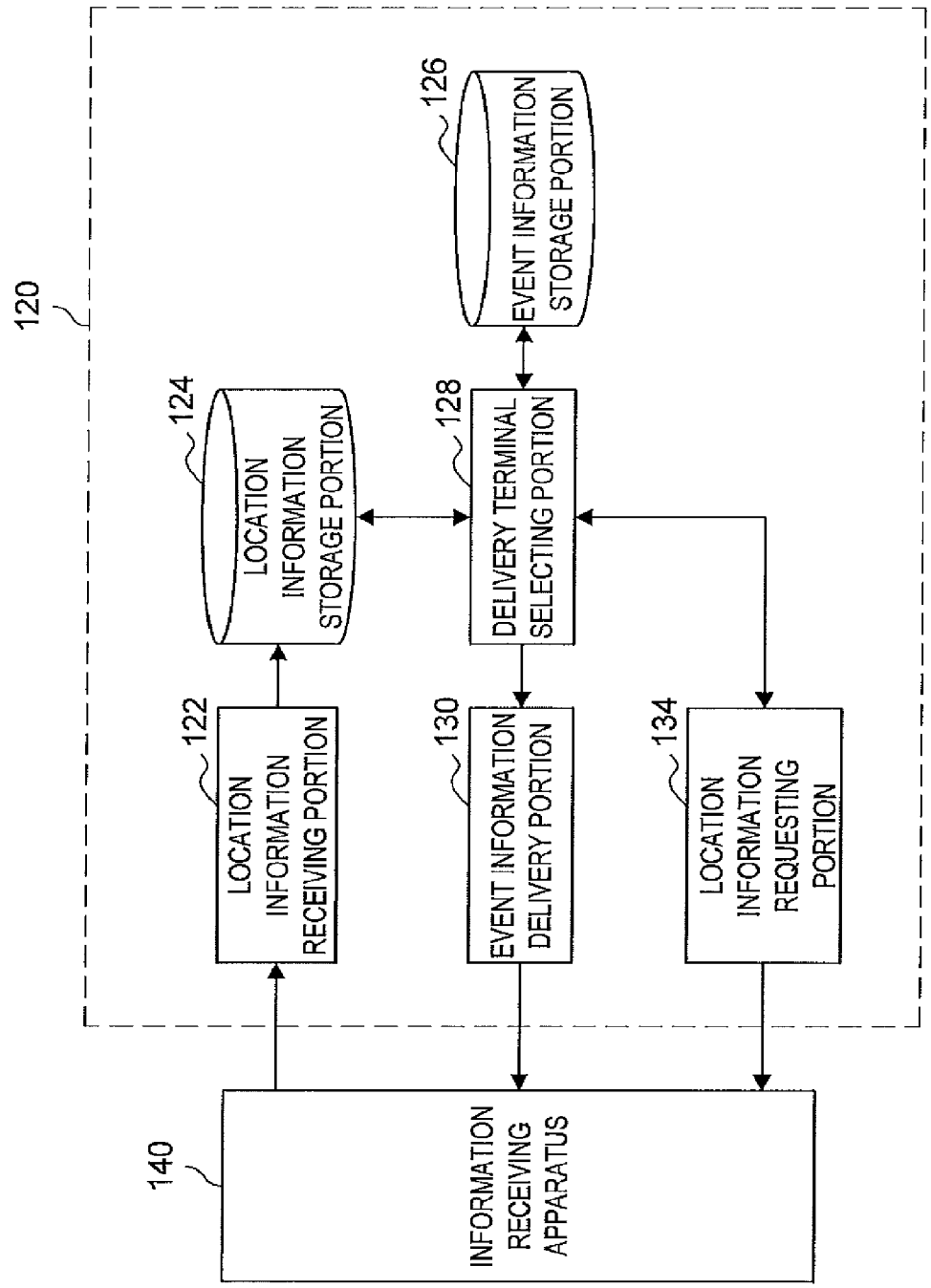
FIG. 8 is a functional block diagram showing a schematic configuration of an information delivery apparatus according to a third embodiment of the present invention.

A third embodiment of the present invention describes an example of the information delivery system in which the information delivery apparatus 120 selects a delivery terminal using the current location information, in addition to the past location information, of the information receiving apparatus 140. FIG. 8 is a functional block diagram showing an example of the information delivery apparatus 120 which selects a delivery terminal with use of the current location information, in addition to the past location information, of the information receiving apparatus 140. In FIG. 8, the functional portions which correspond to those shown in FIG. 2 or 5 are denoted by the same reference numerals, and the description of those are omitted as appropriate in order to avoid redundant description.

The information delivery apparatus 120 shown in FIG. 8 is different from the information delivery apparatus 120 shown in FIG. 2 or 5 in that it further includes a location information requesting portion 134 which requests information about a current location to the information receiving apparatus 140, so that the delivery terminal selecting portion 128 selects a delivery terminal using the current location information, in addition to the past location information, of the information receiving apparatus 140. After the delivery terminal selecting portion 128 selects delivery terminals by performing the processing in the same manner as the delivery terminal selecting portion 128 of the first embodiment or the second embodiment described above, it makes the location information requesting portion 134 request current location information to the information receiving apparatus 140 and receives the current location information of the information receiving apparatus 140. The delivery terminal selecting portion 128 then compares the current location of the information receiving apparatus 140 with information about a place where an event is held which is included in event information, and, if a distance between the current location and the event place is equal to or longer than a predetermined threshold, the delivery terminal selecting portion 128 does not select the relevant information receiving apparatus 140 as a delivery terminal. In this configuration, even if a user has visited an event place in the past, when the user is far away from the event place at the time of delivering event information (for example, when the event is held in Tokyo and the user is in Kagoshima prefecture), it is possible to judge that the user is not likely to come to the event and refrain from transmitting the event information to the user.

Figure 9:
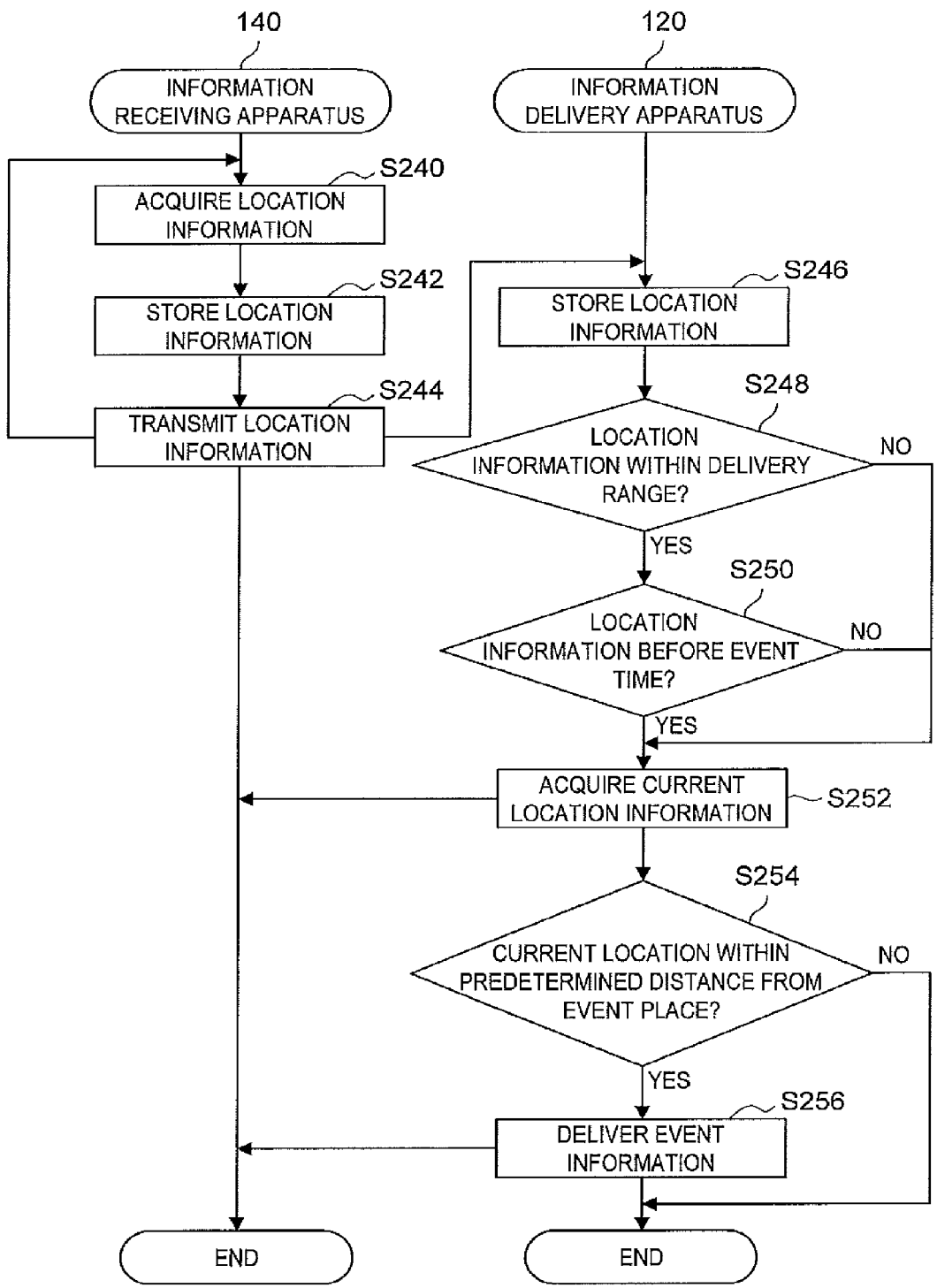
FIG. 9 is a flowchart showing a flow of an information delivery process which is executed by an information delivery system according to the third embodiment.

Referring next to FIG. 9, an information delivery process in the case of using the information delivery apparatus 120 of FIG. 8 is described hereinafter. FIG. 9 is a flowchart showing a flow of an information delivery process which is executed by the information delivery system 100 according to the third embodiment of the present invention. In FIG. 9, the processing in the steps S240 to S250 is substantially the same as the processing in the steps S200 to S210 shown in FIG. 4 and thus not described in detail herein.

After selecting the information receiving apparatus 140 to which event information is to be delivered by the processing in the steps S248 to S250, the location information requesting portion 134 of the information delivery apparatus 120 requests each information receiving apparatus 140 to transmit location information indicating a current location (step S252). Then, the delivery terminal selecting portion 128 compares the current location information of each information receiving apparatus 140 which is acquired by the step S252 with the event place which is included in the event information and determines whether the information receiving apparatus 140 exists within a predetermined distance from the event place (step S254). The determination may be performed using a physical distance between the current location of the information receiving apparatus 140 and the event place, or using a travel distance or a necessary travel time by calculating a time needed to travel from the current location of the information receiving apparatus 140 to the event place.

If the determination processing in the step S254 determines that the distance is equal to or shorter than a predetermined length, the event information delivery portion 130 of the information delivery apparatus 120 delivers event information to the relevant information receiving apparatus 140 (step S256). On the other hand, if the distance is longer than the predetermined length, the event information delivery portion 130 does not deliver event information to the relevant information receiving apparatus 140.

In such a process, even if a person has visited a place where an event is held in the past, when the user is far away from the event place at the time of delivering information, it is possible to refrain from delivering event information to the person. It is thereby possible to deliver event information by excluding a person who is less likely to come to the event.

Although the information delivery apparatus 120 which delivers event information selects the information receiving apparatus 140 to which event information is to be delivered and delivers the event information thereto in the first to third embodiments described above, the information receiving apparatus 140 which receives event information may sort out the event information to be shown to a user depending on its location information.

(Fourth Embodiment)

Figure 10:
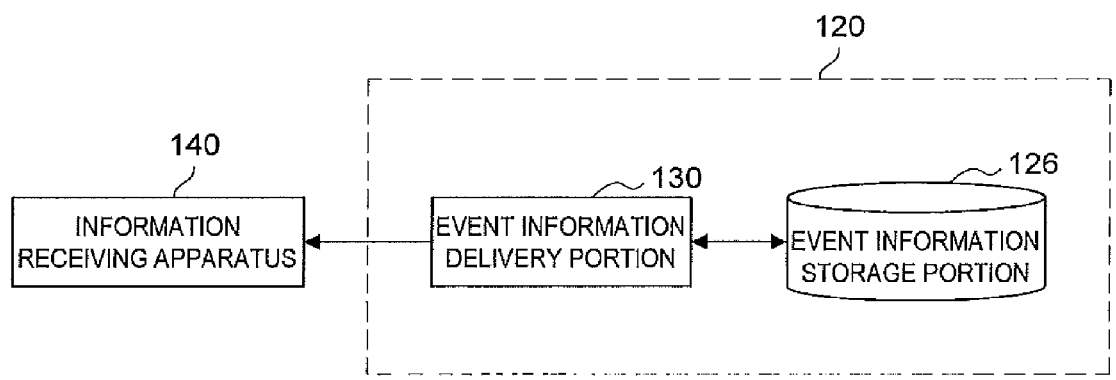
FIG. 10 is a functional block diagram showing a schematic configuration of an information delivery apparatus according to a fourth embodiment of the present invention.
Figure 11:
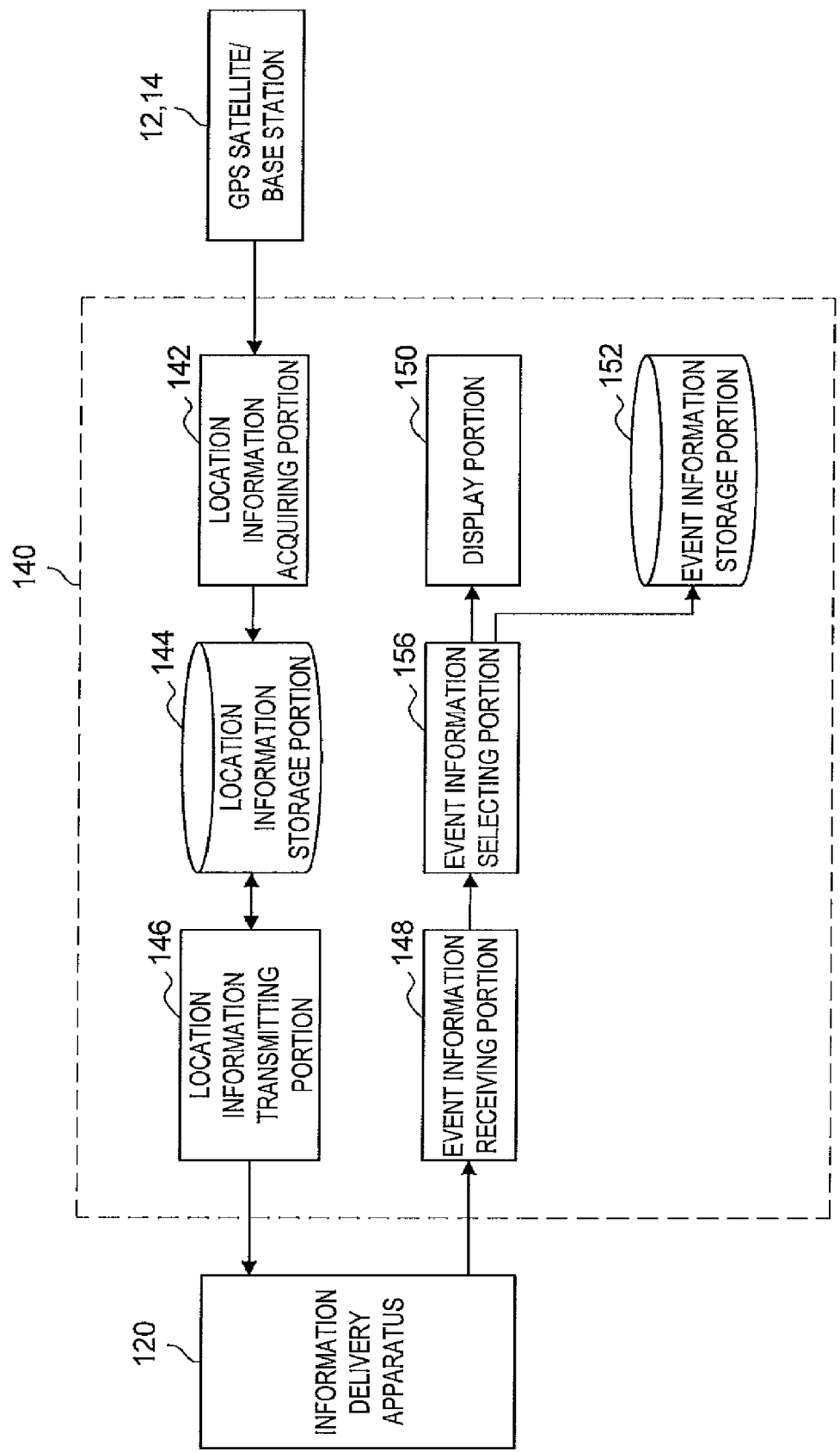
FIG. 11 is a functional block diagram showing a schematic configuration of an information receiving apparatus according to the fourth embodiment.

A fourth embodiment of the present invention describes an example of the information delivery system in which the information receiving apparatus 140 filters event information which is delivered by the information delivery apparatus 120 and divides the event information into information to be notified to a user and information not to be notified to a user. FIG. 10 is a functional block diagram showing a schematic configuration of the information delivery apparatus 120 according to the fourth embodiment. FIG. 11 is a functional block diagram showing a schematic configuration of the information receiving apparatus 140 according to the fourth embodiment. In FIGS. 10 and 11, the functional portions which correspond to those shown in FIGS. 2 and 3 are denoted by the same reference numerals, and the description of those are omitted as appropriate in order to avoid redundant description.

As shown in FIG. 10, the information delivery apparatus 120 according to this embodiment is different from the information delivery apparatus 120 according to the first to third embodiments described above in that it does not include the elements such as the location information receiving portion 122 and the delivery terminal selecting portion 128 for selecting a terminal to which event information is to be delivered. The information delivery apparatus 120 transmits event information which is stored in the event information storage portion 126 to all of the information receiving apparatus 140 which are registered beforehand.

On the other hand, as shown in FIG. 11, the information receiving apparatus 140 according to this embodiment is different from the information receiving apparatus 140 according to the first to third embodiments in that it further includes an event information selecting portion 156 so as to select event information to be displayed on the display portion 150 from the event information which is transmitted from the information delivery apparatus 120. The event information selecting portion 156 compares the place and the time of each event information which is received by the event information receiving portion 148 with the past location information which is stored in the location information storage portion 144 and determines whether to display each event information on the display portion 150.

Specifically, the event information selecting portion 156 refers to an event place included in event information which is stored in the event information storage portion 152 and determines whether there is location information which is stored in the location information storage portion 144 and which falls within a predetermined range from the event place. If there is such location information, the event information selecting portion 156 further determines whether the acquired date and time of the location information is before the date and time when the event is held and, if so, it displays the relevant event information on the display portion 150. Event information which is not displayed on the display portion 150 may be discarded or stored into the event information storage portion 152 together with the displayed event information.

The event information selecting portion 156 may further narrow down the event information to be displayed based on attribute information such as user's gender, age and interest or the current location of the information receiving apparatus 140, just like the information delivery apparatus 120 according to the second and third embodiments.

Figure 12:
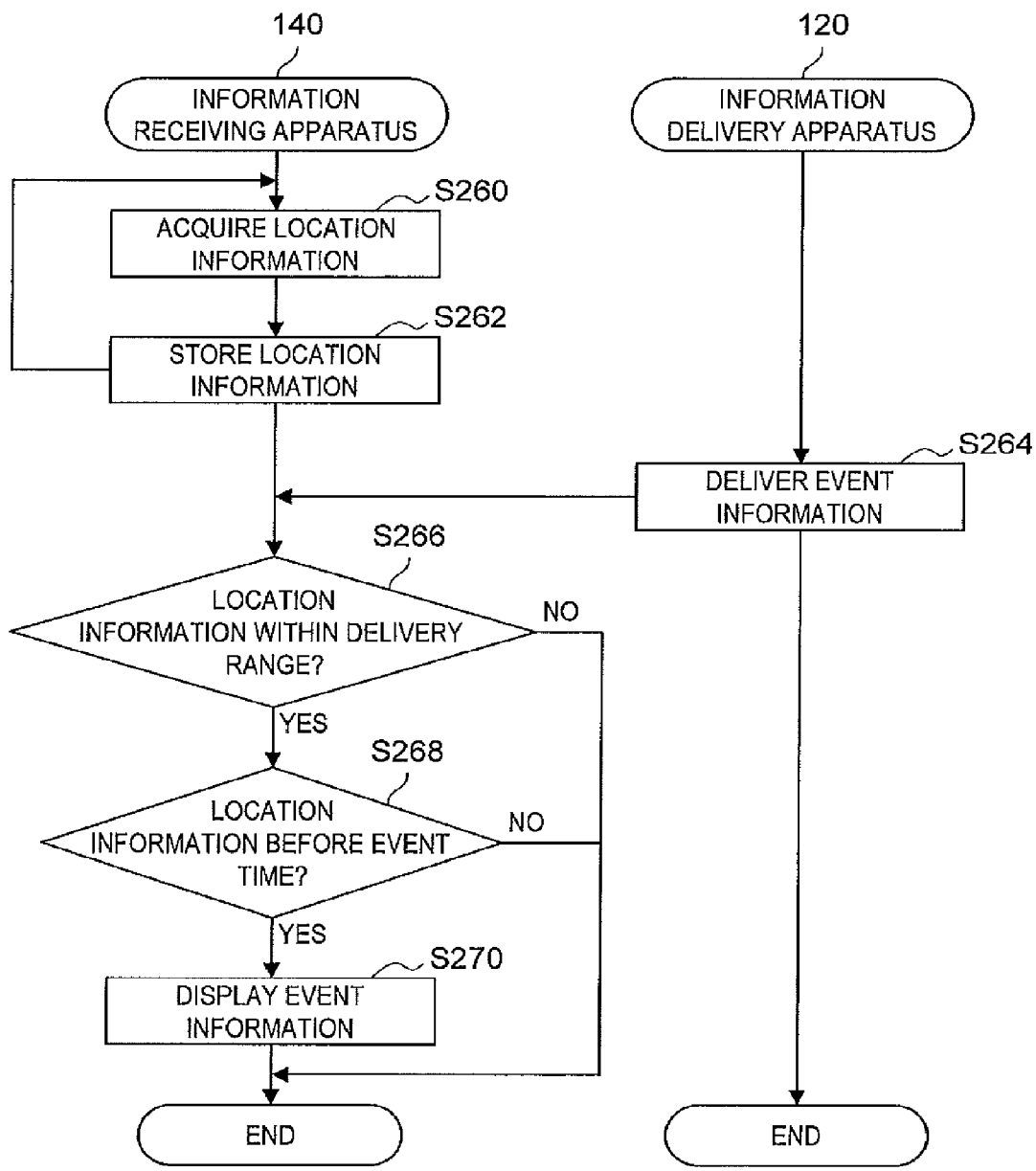
FIG. 12 is a flowchart showing a flow of an information delivery process which is executed by an information delivery system according to the fourth embodiment.

Referring next to FIG. 12, an information delivery process in the case of using the information delivery apparatus 120 of FIG. 10 and the information receiving apparatus 140 of FIG. 11 is described hereinafter. FIG. 12 is a flowchart showing a flow of an information delivery process which is executed by the information delivery system 100 according to the fourth embodiment of the present invention.

In FIG. 12, the processing in the steps S260 to S262 is substantially the same as the processing in the steps S200 to S202 shown in FIG. 4 and thus not described in detail herein. The information delivery apparatus 120 transmits event information to the information receiving apparatus 140 at given timing (step S264). Receiving the event information, the information receiving apparatus 140 compares a range of delivery terminal location of event information or an event place with location information which is stored in the location information storage portion 144 and determines whether there is location information which falls within the range that is defined by the event information (step S266).

If there is location information which falls within the range, the information receiving apparatus 140 compares the acquired date and time of the relevant location information with the time when the event is held and determines whether the location information acquired date and time is before the event time (step S268). If this condition is satisfied, the event information which is transmitted from the information delivery apparatus 120 in the step S264 is displayed on the display portion 150 of the information receiving apparatus 140. If the condition is not satisfied in the step S266 and the step S268, the event information is not displayed on the display portion 150.

In this manner, it is feasible that an event information delivering end does not filter delivery destination terminals at the time of delivering event information and an event information receiving end filters the received event information. In this configuration, a terminal which receives information can refer to its past location information and presents only related event information to a user. This eliminates the need to supply location information from a terminal to an information delivery apparatus, thereby reducing a communication traffic amount from the terminal and processing for the communication. This also eliminates the need to store location information of each terminal in an information delivering end, thereby reducing a storage area to be reserved.

An example of the information delivery system in which the information delivery apparatus 120 selects the information receiving apparatus 140 to which event information is to be delivered based on the past location information of the information receiving apparatus 140 is described in the first to third embodiments described earlier. Further, an example of the information delivery system in which the selection processing based on the past location information of the information receiving apparatus 140 is performed in a receiving end is described in the fourth embodiment described above. In the followings, an example of the information delivery system in which event information is transmitted as a reminder at the latest possible time before an event time based on the current location of the information receiving apparatus 140 is described as a method for enhancing the advertising effects of event information delivery to the information receiving apparatus 140.

(Fifth Embodiment)

Figure 13:
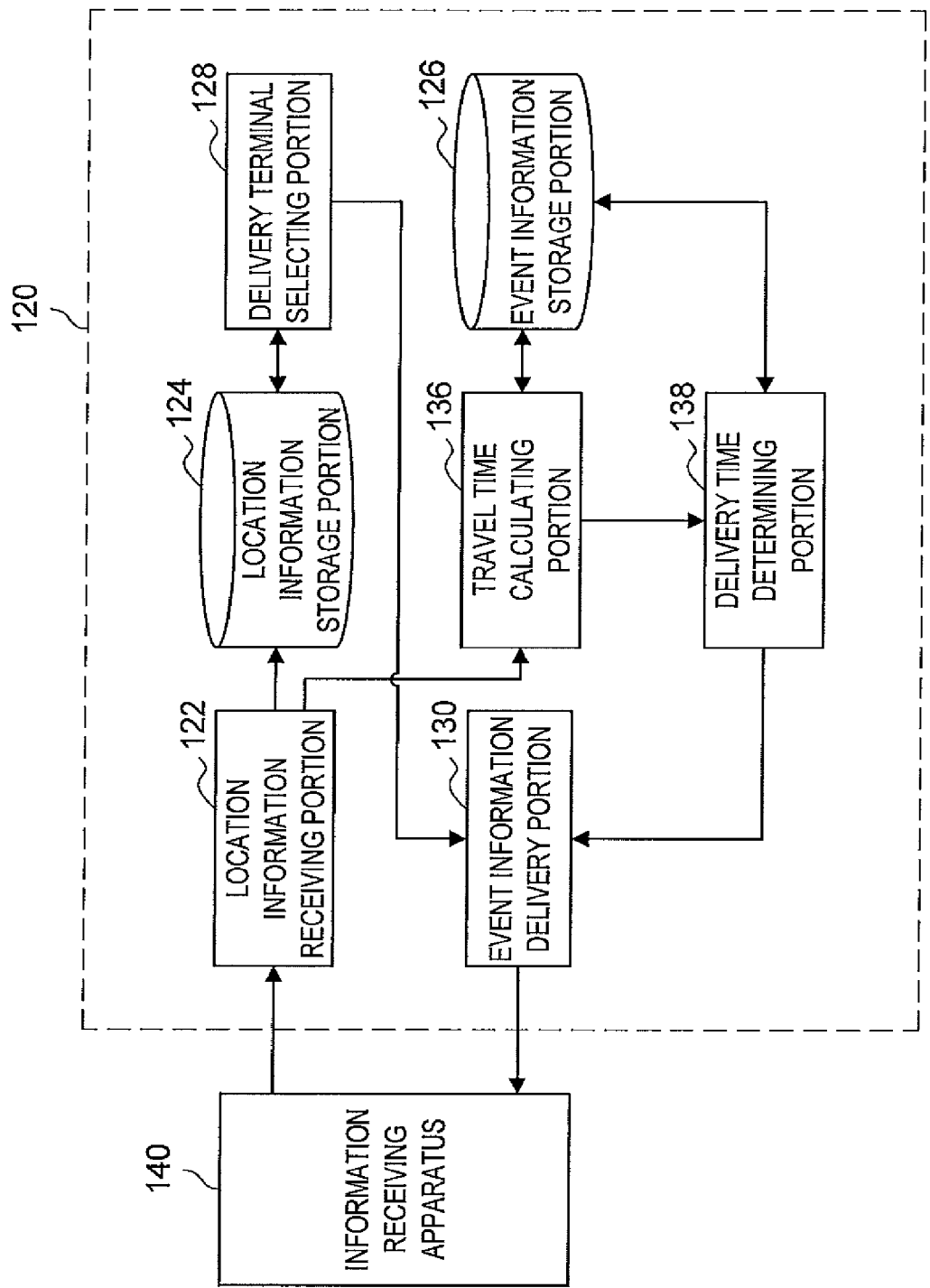
FIG. 13 is a functional block diagram showing a schematic configuration of an information delivery apparatus according to a fifth embodiment of the present invention.

A fifth embodiment of the present invention describes an example of the information delivery system in which the information delivery apparatus 120 transmits event information as a reminder at the latest possible time before an event time. FIG. 13 is a functional block diagram showing a schematic configuration of the information delivery apparatus 120 according to the fifth embodiment. In FIG. 13, the functional portions which correspond to those of the information delivery apparatus 120 shown in FIG. 2 and so on are denoted by the same reference numerals, and the description of those are omitted as appropriate in order to avoid redundant description. The information receiving apparatus 140 according to this embodiment has substantially the same configuration as the information receiving apparatus 140 according to the first to third embodiments described above and not described in detail herein.

As shown in FIG. 13, the information delivery apparatus 120 according to the fifth embodiment further includes a travel time calculating portion 136 and a delivery time determining portion 138 in addition to the elements of the information delivery apparatus 120 according to the first embodiment shown in FIG. 2. The information delivery apparatus 120 of this embodiment transmits event information as a reminder to the information receiving apparatus 140 that is determined as a delivery terminal to which event information is to be transmitted by the same processing as in the information delivery apparatus 120 of the first to third embodiments at the latest possible time before an event time when an event is held. Further, the information delivery apparatus 120 determines a time to transmit event information by checking the current location of each information receiving apparatus 140 and calculating a time needed to travel from the current location to an event place where the event is held, so that a user who receives the reminder can reach the event place by the event time.

The information receiving apparatus 140 of this embodiment acquires location information indicating its current location periodically and transmits the location information to the information delivery apparatus 120 each time it acquires the information. The information delivery apparatus 120 receives the location information of the information receiving apparatus 140 by the location information receiving portion 122 and, if it is the information receiving apparatus 140 that is a target of transmitting a reminder, the information delivery apparatus 120 calculates a time to transmit a reminder by the travel time calculating portion 136 and the delivery time determining portion 138.

The travel time calculating portion 136 receives location information of the information receiving apparatus 140 from the location information receiving portion 122 and calculates a travel time from the place which is indicated by the location information to the event place which is included in the event information. A travel time may be obtained by calculating a necessary time from the nearest station of the current location of the information receiving apparatus 140 to the nearest station of an event place, a necessary time to each nearest station and so on using route search technology of a public transportation, an expressway or the like. A calculated necessary travel time may be one, or, if there are a plurality of possible travel routes, a plurality of travel times may be calculated corresponding thereto.

The delivery time determining portion 138 determines a time to deliver event information (reminder) based on a travel time which is calculated by the travel time calculating portion 136 and an event time. A delivery time may be set so that an interval between the delivery time and the event time is at least equal to the travel time. Alternatively, a delivery time may be set so that an interval between the delivery time and the event time is longer than the necessary travel time in order to allow an extra time. For example, if an event time is 14:00 and a travel time which is calculated by the travel time calculating portion 136 is 1 hour, the delivery time determining portion 138 may set a delivery time to 13:00 or to 12:30 with extra 30 minutes.

If a plurality of travel times are calculated by the travel time calculating portion 136, a delivery time may be determined based on the longest or shortest travel time or based on the average of the plurality of travel times. Further, it is feasible to refrain from transmitting a reminder if a travel time is equal to or longer than a certain value. For example, if a travel time from the current location is 2 hours or longer, a reminder may not be transmitted on the assumption that it is less likely to come to the event.

Furthermore, it is feasible to refrain from transmitting a reminder to the information receiving apparatus 140 to which the reminder has been transmitted once. For example, if an event time is 14:00 and a travel time which is calculated at 11:00 is 2 hours, for example, a reminder delivery time is determined to be 12:00, so that the first reminder is transmitted at 12:00. After that, a travel time is calculated again based on the location information which is received at 12:30, and if the calculated travel time is 1 hour, a reminder delivery time is set to 13:00, so that the second reminder is transmitted at 13:00. In order to remove the burden that a user receives a reminder again and again in such a case, the calculation of a delivery time by the travel time calculating portion 136 and the delivery time determining portion 138 may not be performed for the information receiving apparatus 140 to which the reminder has been transmitted once.

In the above description, an "event time" may be a start time or an end time of an event. Alternatively, it may be a particular time during an event being held. For example, if the most principal part of an event which is held from 13:00 to 18:00 is performed at 15:00, an "event time" may be set to 15:00, and a reminder may be delivered so that a user can come to the event by 15:00. Alternatively, a plurality of "event times" may be set for one event, and a reminder may be delivered in accordance with the nearest "event time".

When an "event time" is set to an event end time, for example, there is a possibility that a reminder will be transmitted to a user who has come to the event already. To avoid this, it is feasible to refrain from transmitting event information as a reminder to the information receiving apparatus 140 which comes to the event place or its vicinity during the period by referring to location information of each information receiving apparatus 140 during the period when the event is held.

Figure 14:
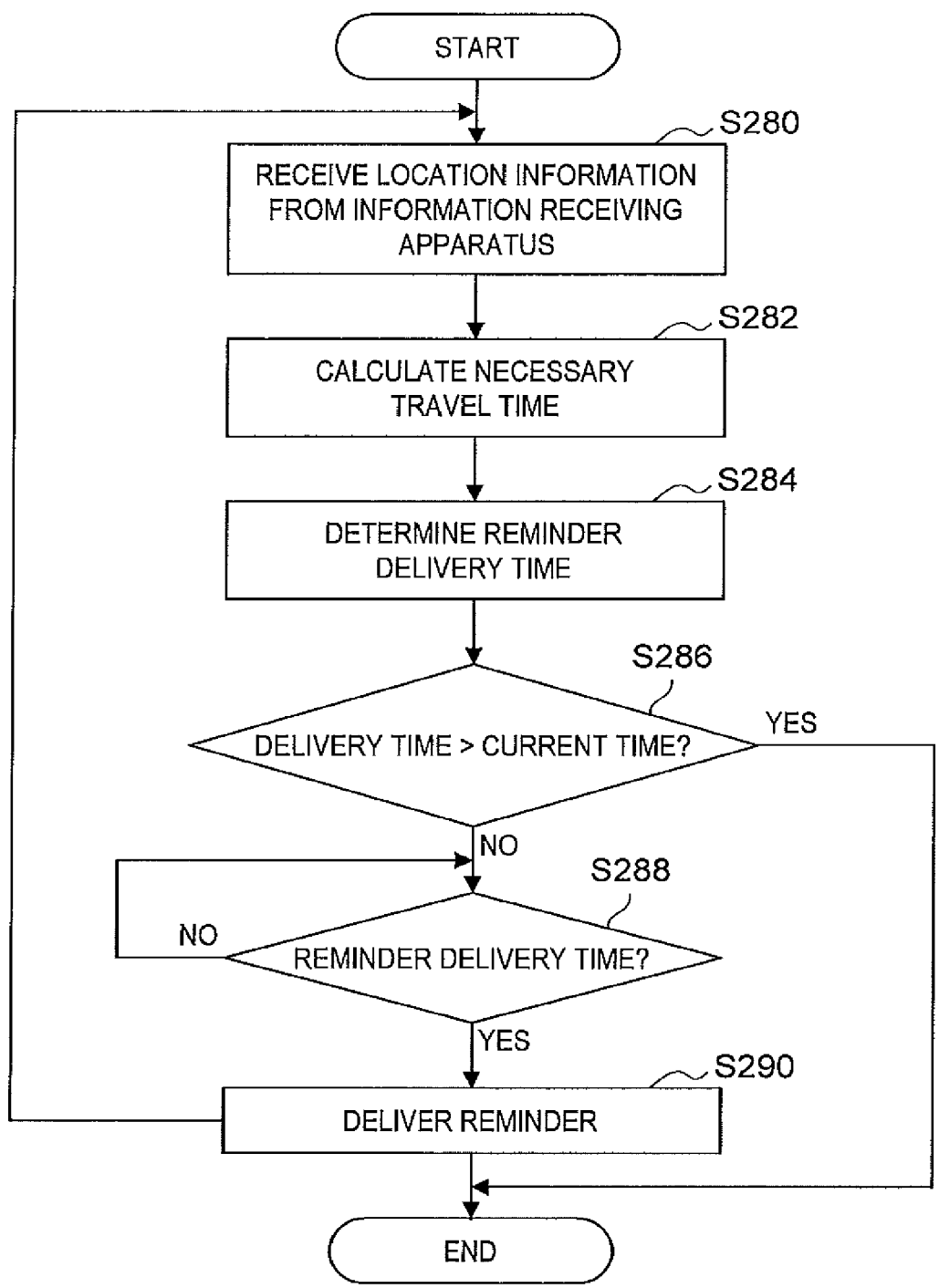
FIG. 14 is a flowchart showing a flow of an information delivery process which is executed by an information delivery system according to the fifth embodiment.

Referring next to FIG. 14, an information delivery process in the case of using the information delivery apparatus 120 of FIG. 13 is described hereinafter. FIG. 14 is a flowchart showing a flow of an information delivery process which is executed by the information delivery system 100 according to the fifth embodiment of the present invention.

First, the information delivery apparatus 120 receives location information indicating a current location from the information receiving apparatus 140 (step S280). The location information may be transmitted from the information receiving apparatus 140 at regular time intervals, for example.

Next, the travel time calculating portion 136 of the information delivery apparatus 120 calculates a time needed to travel from the current location of the information receiving apparatus 140 to the event place based on the location information which is received in the step S280 (step S282). Then, the delivery time determining portion 138 of the information delivery apparatus 120 determines a time to deliver event information as a reminder based on the necessary travel time which is calculated in the step S282 (step S284). Further, it is determined whether the calculated delivery time is earlier than the current time, that is, whether the current time is already past the delivery time (step S286). If the current time is already past the delivery time, the information delivery apparatus 120 ends the process. Alternatively, the information delivery apparatus 120 may return to the step S280 and repeat the processing of calculating a delivery time based on newly transmitted location information.

On the other hand, if the delivery time is the current time or later, that is, if the current time is not yet past the delivery time in the step S286, the information delivery apparatus 120 waits until the delivery time which is determined by the step S284 (step S288) and then transmits event information as a reminder to the information receiving apparatus 140 at the delivery time (step S290). After that, the information delivery apparatus 120 returns to the step S280 and repeats the processing of calculating a delivery time based on newly transmitted location information. Alternatively, it may end the process once it has transmitted a reminder in the step S290, so that the reminder is not transmitted a plurality of times.

In such a process, a reminder can be transmitted in time for an event time based on a current location of a user. This allows a user to remind the event even if the user has received event information before but forgets it just before the event. Further, because a reminder is transmitted at such a time that a user can come to an event in time, a user who intends to come to the event can come to the event without fail by the reminder. This further increases the advertising effects of event information which is notified in advance.

Although the information delivery apparatus 120 delivers a reminder at an appropriate time according to the current location of the information receiving apparatus 140 in the fifth embodiment described above, the information receiving apparatus 140 which receives event information may present a reminder to a user at an appropriate time based on its location information.

(Sixth Embodiment)

Figure 15:
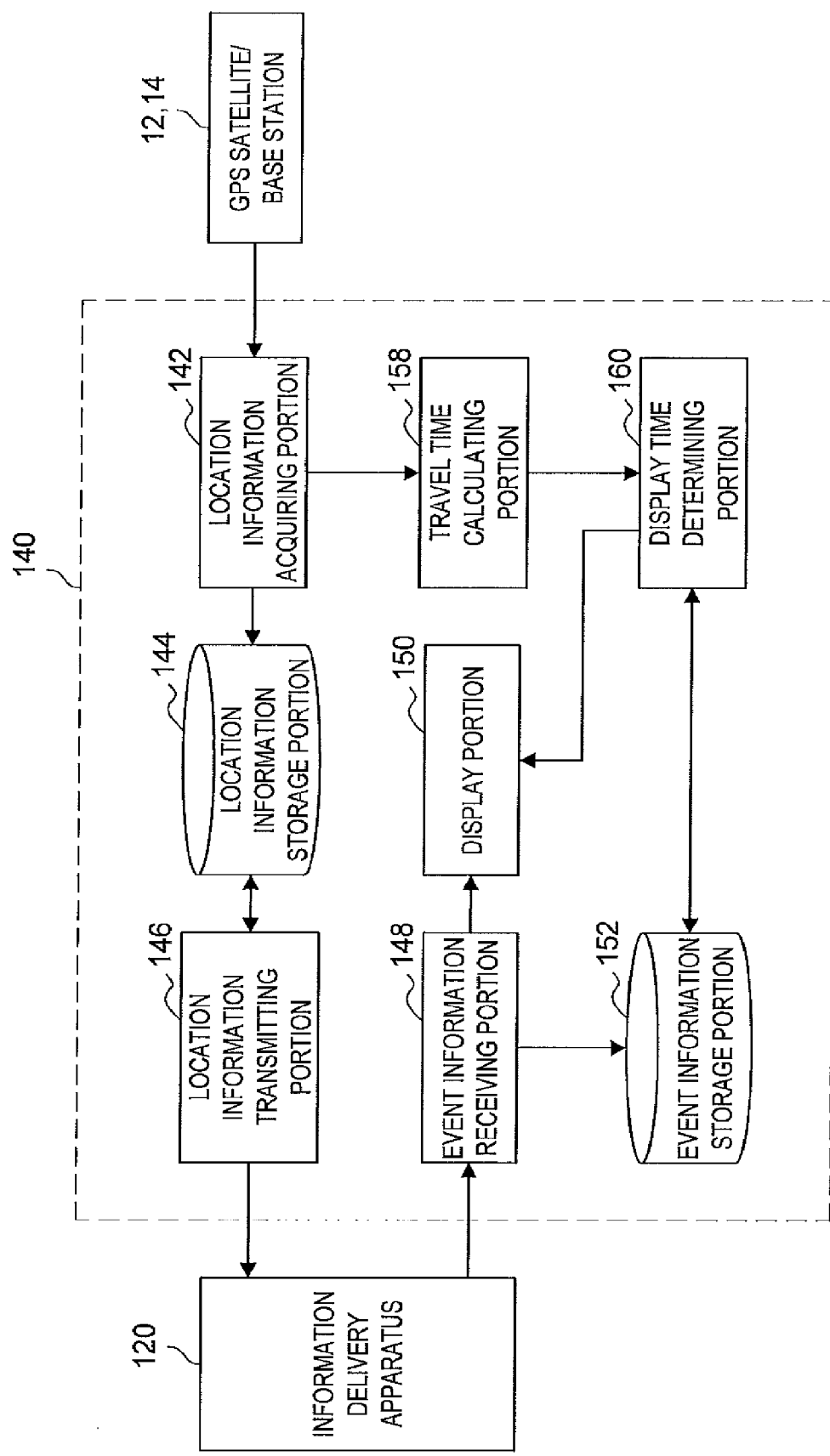
FIG. 15 is a functional block diagram showing a schematic configuration of an information receiving apparatus according to a sixth embodiment of the present invention.

A sixth embodiment of the present invention describes an example of the information delivery system in which the information receiving apparatus 140 accumulates event information which is delivered from the information delivery apparatus 120 and notifies the event information to a user as a reminder just before an event time. FIG. 15 is a functional block diagram showing a schematic configuration of the information receiving apparatus 140 according to the sixth embodiment. In FIG. 15, the functional portions which correspond to those shown in FIG. 3 are denoted by the same reference numerals, and the description of those are omitted as appropriate in order to avoid redundant description. The information delivery apparatus 120 according to this embodiment has substantially the same configuration and functions as the information delivery apparatus 120 according to the fourth embodiment described above and thus not described in detail herein.

As shown in FIG. 15, the information receiving apparatus 140 according to the sixth embodiment further includes a travel time calculating portion 158 and a display time determining portion 160 in addition to the elements of the information receiving apparatus 140 according to the first embodiment shown in FIG. 3. The information receiving apparatus 140 of this embodiment accumulates event information which is received at given timing from the information delivery apparatus 120 and displays the accumulated event information as a reminder at the latest possible time before an event time. Further, the information receiving apparatus 140 determines a time to display event information by checking its current location and calculating a time needed to travel from the current location to the event place, so that a user who views the reminder can reach the event place by the event time.

The travel time calculating portion 158 receives location information indicating a current location which is periodically acquired by the location information acquiring portion 142 and calculates a travel time from the place that is indicated by the location information to an event place that is included in event information. The processing of calculating a travel time is the same as the processing performed by the travel time calculating portion 136 of the information delivery apparatus 120 according to the fifth embodiment described above and thus not described in detail herein.

The display time determining portion 160 determines a time to display event information (reminder) on the display portion 150 based on the travel time which is calculated by the travel time calculating portion 158 and the event time. The display time determining portion 160 according to this embodiment is an example of an output time determining portion of the present invention, and the display portion 150 is an example of an event information output portion of the present invention. The processing of determining a display time is substantially the same as the processing of determining a delivery time which is performed by the delivery time determining portion 138 of the information delivery apparatus 120 according to the fifth embodiment described above and thus not described in detail herein. At a determined display time, the display time determining portion 160 reads out the event information stored in the event information storage portion 152 and displays the event information on the display portion 150.

Figure 16:
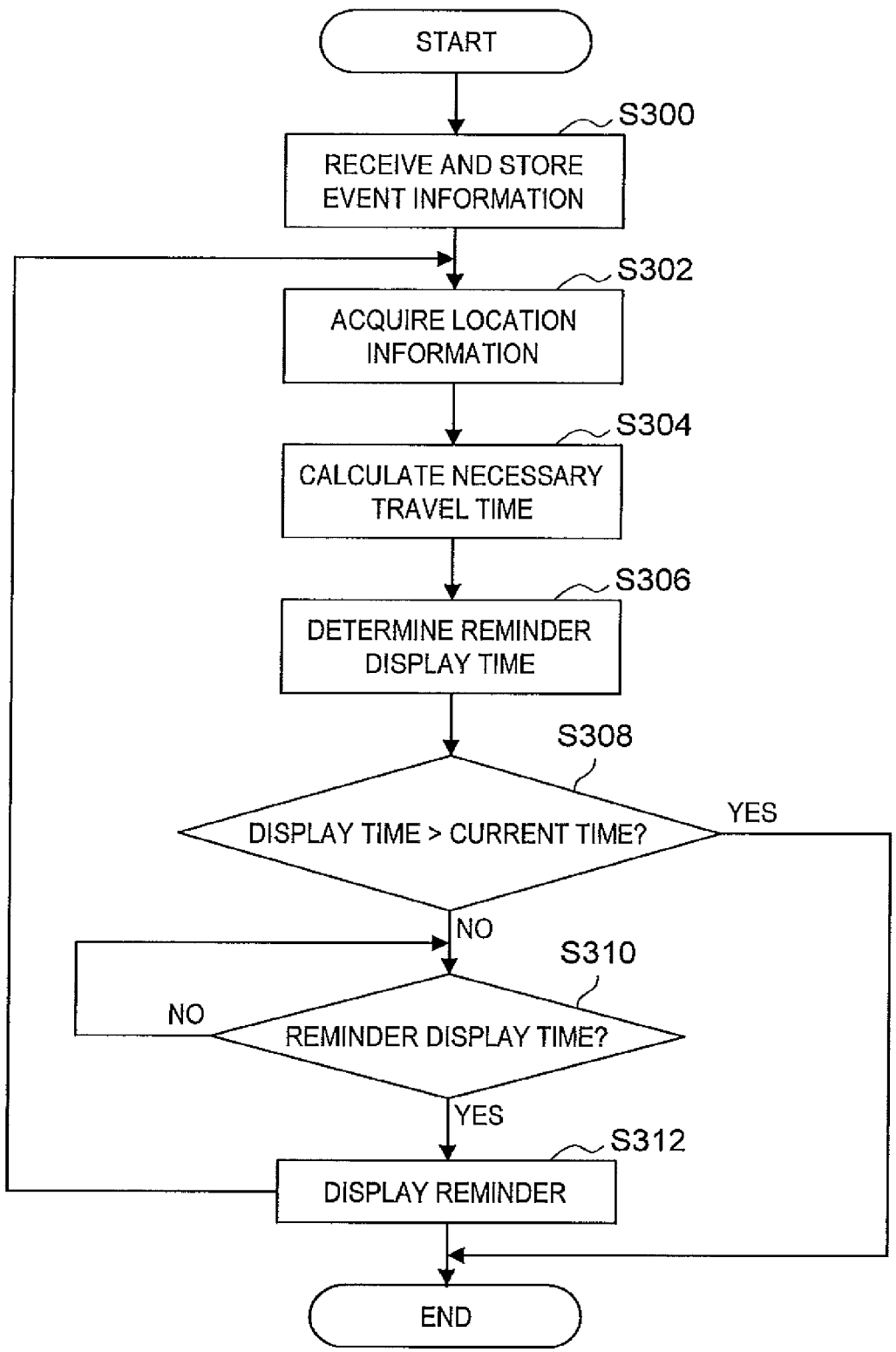
FIG. 16 is a flowchart showing a flow of a reminder display process which is executed by an information delivery system according to the sixth embodiment.

Referring next to FIG. 16, a reminder display process in the case of using the information receiving apparatus 140 of FIG. 15 is described hereinafter. FIG. 16 is a flowchart showing a flow of a reminder display process which is executed by the information delivery system 100 according to the sixth embodiment of the present invention.

First, the information receiving apparatus 140 receives event information from the information delivery apparatus 120 and stores it into the event information storage portion 152 (step S300). Next, the location information acquiring portion 142 acquires location information indicating its current location from the GPS satellite 12 or the base station 14 (step S302).

Then, the travel time calculating portion 158 calculates a time needed to travel from the current location of the information receiving apparatus 140 which is acquired in the step S302 to an event place included in the event information which is stored in the event information storage portion 152 (step S304). Further, the display time determining portion 160 determines a time to display the event information as a reminder based on the necessary travel time which is calculated in the step S304 (step S306).

Then, it is determined whether the calculated display time is earlier than the current time, that is, whether the current time is already past the display time (step S308). If the current time is already past the display time, the information receiving apparatus 140 ends the reminder display process. Alternatively, the information receiving apparatus 140 may return to the step S302 and repeat the processing of calculating a reminder display time based on newly acquired location information.

On the other hand, if the display time is the current time or later, that is, if the current time is not yet past the display time in the step S308, the information receiving apparatus 140 waits until the display time which is determined by the step S306 (step S310) and, at the display time, reads out the event information from the event information storage portion 152 and displays it on the display portion 150 (step S312). After that, the information receiving apparatus 140 returns to the step S302 and repeats the processing of calculating a reminder display time based on newly acquired location information. Alternatively, it may end the process so that a reminder is not displayed a plurality of times for the event information for which the reminder has been displayed once.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
circuitry configured to generate data for issuing a notification of an event at a time being based on information including a time of the event and a travel time between a location of an apparatus and a location of the event,
wherein the circuitry is configured to not display the notification at least when the travel time is longer than the interval between a current time and the time of the event, and
wherein the current time is before the time of the event.

2. An information processing method, comprising:
generating data for issuing a notification of an event at a time being based on information including a time of the event and a travel time between a location of an apparatus and a location of the event,
wherein the notification is not displayed at least when the travel time is longer than the interval between a current time and the time of the event, and
wherein the current time is before the time of the event.

3. At least one non-transitory computer readable storage medium having stored thereon instructions, which, when executed by a processor, perform an information processing method, the method comprising:
generating data for issuing a notification of an event at a time being based on information including a time of the event and a travel time 15 between a location of an apparatus and a location of the event,
wherein the notification is not displayed at least when the travel time is longer than the interval between a current time and the time of the event, and
wherein the current time is before the time of the event.

4. At least one non-transitory computer readable storage medium of claim 3, wherein the data is for at least one display to display the notification.

5. At least one non-transitory computer readable storage medium of claim 3, wherein the travel time is one of a plurality of travel times calculated for a plurality of possible travel routes from the location of the mobile apparatus to the location of the event.

6. At least one non-transitory computer readable storage medium of claim 3, wherein the time at which the notification is issued is further based on allowing extra time.

7. At least one non-transitory computer readable storage medium of claim 3, wherein the notification is based on historical information.

8. At least one non-transitory computer readable storage medium of claim 7, wherein the historical information comprises a past location of the apparatus.

9. At least one non-transitory computer readable storage medium of claim 7, wherein the historical information comprises information regarding a past history of display of at least one notification.

10. At least one non-transitory computer readable storage medium of claim 3, wherein the apparatus is configured to send information identifying the location of the apparatus to an information processing system at regular intervals.

11. At least one non-transitory computer readable storage medium of claim 3, wherein the method further comprises generating data for issuing the notification at an updated time, the updated time being based upon an updated travel time, the updated travel time being based upon an updated location of the apparatus.

12. At least one non-transitory computer readable storage medium of claim 3, wherein the notification includes the time of the event.

13. At least one non-transitory computer readable storage medium of claim 3, wherein the notification includes the location of the event.

14. At least one non-transitory computer readable storage medium of claim 3, wherein the notification includes information about a detail of the event.

15. At least one non-transitory computer readable storage medium of claim 3, wherein the notification includes information about delivery of information regarding the event.

16. At least one non-transitory computer readable storage medium of claim 3, wherein the apparatus is a mobile communications terminal.

17. At least one non-transitory computer readable storage medium of claim 16, wherein the mobile communications terminal is configured to determine the location of the mobile communications terminal based on a signal from a satellite.

18. At least one non-transitory computer readable storage medium of claim 16, wherein the mobile communications terminal is a mobile phone.

* * * * *